(12) United States Patent
Franjic et al.

(10) Patent No.: US 10,809,199 B2
(45) Date of Patent: Oct. 20, 2020

(54) DYNAMIC RAMAN SIGNAL ACQUISITION SYSTEM, METHOD AND APPARATUS

(71) Applicant: Synaptive Medical (Barbados) Inc., Bridgetown (BB)

(72) Inventors: Kresmir Franjic, Toronto (CA); Yusuf Bismilla, Toronto (CA); Siu Way Jacky Mak, Toronto (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 36 days.

(21) Appl. No.: 16/056,692

(22) Filed: Aug. 7, 2018

(65) Prior Publication Data

US 2020/0049627 A1 Feb. 13, 2020

(51) Int. Cl.
*G01N 21/65* (2006.01)

(52) U.S. Cl.
CPC ..... *G01N 21/65* (2013.01); *G01N 2201/0221* (2013.01); *G01N 2201/06113* (2013.01); *G01N 2201/124* (2013.01)

(58) Field of Classification Search
CPC ............. G01N 21/65; G01N 2201/124; G01N 2201/06113; G01N 2201/0221
See application file for complete search history.

(56) References Cited

U.S. PATENT DOCUMENTS

| | | | |
|---|---|---|---|
| 5,397,989 A * | 3/1995 | Spraul | G01R 33/307 324/318 |
| 5,572,125 A | 11/1996 | Dunkel | |
| 7,557,915 B2 | 7/2009 | Maier et al. | |
| 7,605,918 B2 | 10/2009 | Dalrymple | |
| 9,074,932 B2 | 7/2015 | Kojima et al. | |
| 2001/0050802 A1 * | 12/2001 | Namiki | H01S 3/302 359/337.11 |
| 2003/0106492 A1 | 6/2003 | Levinson et al. | |
| 2004/0073120 A1 * | 4/2004 | Motz | A61B 5/0071 600/478 |
| 2007/0127019 A1 * | 6/2007 | Zribi | G01J 3/02 356/301 |

(Continued)

FOREIGN PATENT DOCUMENTS

EP 3388818 10/2018

OTHER PUBLICATIONS

Chen, Kun, et al. "Improved Savitzky-Golay-method-based fluorescence subtraction algorithm for rapid recovery of Raman spectra." Applied optics 53.24 (2014): 5559-5569.

(Continued)

*Primary Examiner* — Hina F Ayub

(57) ABSTRACT

A dynamic Raman signal acquisition apparatus, system, and method involving: an excitation light source operable at a designated irradiation power and for a designated acquisition time for each Raman data acquisition; a Raman probe operatively associated with said excitation light source to irradiate the biological tissue at said designated irradiation power and for said designated acquisition time, and capture an optical Raman response therefrom; a spectrometer operable to spectrally analyze said optical Raman response; and a controller in operative communication with said excitation light source and said spectrometer to automatically adjust at least one signal acquisition parameter.

16 Claims, 15 Drawing Sheets

(56) References Cited

U.S. PATENT DOCUMENTS

| | | | | |
|---|---|---|---|---|
| 2010/0191506 | A1* | 7/2010 | Chyba | G01J 3/02 |
| | | | | 702/182 |
| 2011/0317158 | A1* | 12/2011 | Lyng | G01N 21/65 |
| | | | | 356/301 |
| 2012/0188538 | A1 | 7/2012 | Patil et al. | |
| 2013/0162989 | A1* | 6/2013 | Chen | G01J 3/28 |
| | | | | 356/301 |
| 2013/0169959 | A1 | 7/2013 | Guenther | |
| 2014/0146385 | A1* | 5/2014 | Takeyama | H04B 10/2916 |
| | | | | 359/334 |
| 2014/0268136 | A1 | 9/2014 | Pawluczyk et al. | |
| 2016/0290864 | A1 | 10/2016 | Roy et al. | |
| 2017/0350878 | A1 | 12/2017 | Holmes et al. | |
| 2018/0299384 | A1* | 10/2018 | Baritaux | G01N 21/65 |
| 2019/0285549 | A1* | 9/2019 | Sato | G01N 21/65 |

OTHER PUBLICATIONS

Lopez-Reyes, G. and Perez F. R., A method for the automated Raman spectra acquisition, J. Raman Spectrosc., Jul. 18, 2017, pp. 1-11.

Viazet, Vincent, et al. "Background removal from spectra by designing and minimising a non-quadratic cost function." Chemometrics and intelligent laboratory systems 76.2 (2005): 121-133.

Orfanidis, Sophocles J. Introduction to signal processing. Prentice-Hall, Inc., 1996., pp. 427-453.

Zhao, Jianhua, et al., "Automated autofluorescence background subtraction algorithm for biomedical Raman spectroscopy." Applied spectroscopy 61.11 (2007): 1225-1232.

Search Report issued by the Intellectual Property Office of the United Kingdom in relation to corresponding GB Application No. GB19113281 dated Oct. 30, 2019, 3 pgs.

\* cited by examiner

DYNAMIC RAMAN SIGNAL ACQUISITION SYSTEM, METHOD AND APPARATUS

FIELD

The present disclosure relates generally to optical tissue analysis instruments and systems, used for example, within the context of a medical or surgical procedure, test or analysis, and, in particular, to a dynamic Raman signal acquisition system, method and apparatus.

BACKGROUND

Raman spectroscopy is a powerful technique for analyzing the composition of liquids, gases, and solids. It is based on the Raman scattering and it is widely used in scientific research and industry. Among other applications, it has been recently demonstrated that Raman spectroscopy can be used to identify tumour margins by successfully detecting and differentiating the unique signatures of tumorous and healthy tissues (reference: Jermyn, Michael, et al. "Intraoperative brain cancer detection with Raman spectroscopy in humans." *Science translational medicine* 7.274 (2015)).

Despite being a mature technique, application of Raman spectroscopy is still generally challenging for several reasons. Raman signals are rather weak and can be easily overwhelmed by competing optical signals such as auto-fluorescence. Also, because the Raman signals are weak, sufficiently long integration times are often required for achieving acceptable signal to noise ratios (SNR) which increases the probability of noise interference. However, if the integration times are too long there is a different challenge. Since the competing optical signals (e.g. fluorescence) are frequently much more intense, long integration times can lead to detector saturation and wasted acquisition. For these reasons, setting signal acquisition parameters in advance for an unknown sample can be problematic.

Besides general difficulties there could be additional ones related to specific application circumstances. For example, in some cases the acquisition has to happen without a human operator or in some occasions there is fixed pattern noise. Application of Raman spectroscopy in intraoperative surgical situations has its own characteristic concerns. First, there are maximum applicable excitation light intensities incident at the tissue surfaces since tissues can be damaged if the excitation light is too intense. Second, the overall time available for measurements is usually limited due to time constrained surgical environment. Third, in the case of handheld Raman probes, the acquisitions are frequently performed in unstable environments. Movements of the surgeon's hand holding the probe during the acquisition may change the coupling efficiency for both the excitation light and the signal causing the artifacts in the acquired signals. Other possible reason for instability is the presence of the background ambient lighting typically used in surgical rooms. These light sources—e.g. fluorescence bulbs—may flicker for short periods of time but long enough to cause additional signal artifacts. Moreover, acquisitions may become unstable for a more critical reason if tissue structure starts to change due to presence of the excitation light. This may happen in unlikely but still possible scenario when tissue contains exogenous components (e.g. drugs) that strongly absorb the excitation light which can lower the general damage threshold for that type of tissue.

There have been prior attempts to automatize setting and processing of Raman signal acquisitions but for applications other than surgery. A system disclosed in U.S. Pat. No. 7,605,918 performs a trial measurement for a set acquisition TO and arbitrary excitation optical power. The results is compared against predetermined value for signal to noise ratio (SNR) in order to set new acquisition time and number of acquisitions. The method disclosed in U.S. Pat. No. 7,557,915 involves a two phase process including a photobleaching phase and a spectral acquisition phase. In the photobleaching phase, a series of spectral data sets of a sample are collected. A relative difference is determined between the background of subsequent spectral data sets is determined and compared to a predetermined threshold value. If threshold difference is less than the relative difference between the background of subsequent spectral data sets, the steps of collecting a series of spectra data sets is automatically repeated. In the spectrum acquisition phase, a series of Raman data sets of the sample are collected until a target SNR is obtained. The system disclosed in U.S. Pat. No. 9,074,932B2 performs noise reduction iteratively based on difference in value between an external point of measurement data-blocks making up input spectrum data, and a mean value of measurement data-blocks in the vicinity of the external point. Finally, in reference Lopez-Reyes, Guillermo, and Fernando Rull Perez. "A method for the automated Raman spectra acquisition." *Journal of Raman Spectroscopy* 48.11 (2017): 1654-1664, an algorithm is presented that reduces the auto-fluorescence background noise by photo-bleaching and then single acquisition time and number of acquisition are determined.

In all prior optimization algorithms, no consideration was given to optimizing the intensity of the excitation light which is one of the critical parameters in surgical applications. In methods described in U.S. Pat. No. 7,605,918 and Lopez-Reyes et al, final acquisition parameters are not adjusted dynamically. The methods disclosed in U.S. Pat. Nos. 7,557,915 and 9,074,932B2 are based on specific noise reduction strategies which are not generally applicable in surgical settings.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a dynamic Raman signal acquisition system, method and apparatus that overcome some of the drawbacks of known techniques, or at least, provides a useful alternative thereto. Some aspects of this disclosure provide examples of such systems, methods and apparatus.

For instance, in accordance with some aspects of the present disclosure, a dynamic Raman signal acquisition system, method and apparatus are described for use in a surgical environment to provide real-time optimization of Raman system parameters in use. In some examples, such dynamic adjustments can increase the number of useful acquisitions without invoking significant post-acquisition processing or signal repairs, which, in some applications such as intraoperative or handheld surgical tools, may be time prohibitive if not mostly inaccessible. In some examples, such dynamic adjustments may also, or alternatively, minimize if not entirely avoid the need for manual system adjustments, which again, can be prohibitively time consuming in some applications. These and other aspects, objects, advantages and features of the herein described embodiments will be below described in greater detail.

For example, in accordance with one particular aspect, there is provided a Raman system for analyzing biological tissue, the system comprising: an excitation light source operable at a designated irradiation power and for a designated acquisition time for each Raman data acquisition; a Raman probe operatively associated with said excitation light source to irradiate the biological tissue at said designated irradiation power and for said designated acquisition time, and capture an optical Raman response therefrom; a spectrometer operable to spectrally analyze said optical Raman response; and a controller in operative communication with said excitation light source and said spectrometer to automatically adjust at least one signal acquisition parameter by: acquiring a Raman response signal for said designated irradiation power being set to a predetermined initial irradiation power and at said designated acquisition time; processing an amplitude of said Raman response signal against a designated threshold; and upon said Raman response signal being greater than said designated threshold, said controller is further operable to operatively lower said designated irradiation power and repeat for a subsequent said Raman response signal.

In one embodiment, the predetermined initial irradiation power is a predetermined maximum irradiation power.

In one embodiment, upon said Raman response signal being below said designated threshold, said controller is further operable to increase said designated acquisition time so to increase subsequent Raman response signals toward said threshold.

In one embodiment, the Raman response signal comprises a maximum signal level for a series of initial Raman response signals.

In one embodiment, once said signal acquisition parameter has been adjusted, said controller is further operable to operatively serially acquire a set of background-corrected Raman response signals until a signal-to-noise ratio (SNR) thereof is greater than a designated SNR threshold.

In one embodiment, the controller is further operable to: acquire a first set of background signals to process said background-corrected Raman response signals; and upon said SNR being greater than said designated SNR threshold, acquire a complementary set of background signals such that a total number of acquired background signals is equal to a total number of said background-corrected Raman signals to be used in post-processing said background-corrected Raman signals.

In one embodiment, the controller is further operable to spectrally identify and automatically remove narrow band outliers from said Raman response signals.

In one embodiment, the controller is further operable to spectrally identify an adverse safety feature from said Raman response signals and immediately suspend further acquisition.

In one embodiment, the Raman probe comprises a handheld probe.

In one embodiment, the excitation light source is directly controlled by said controller to adjust said designated irradiation power.

In one embodiment, the system further comprises a power controller operatively disposed between said excitation light source and said Raman probe, and in operative communication with said controller to adjust said designated irradiation power.

In accordance with another aspect, there is provided a computerised method for dynamically acquiring Raman signals for analyzing biological tissue, the method comprising: irradiating the tissue at a designated irradiation power, initially set to a predetermined initial irradiation power, for a designated acquisition time; acquiring a Raman response signal from said irradiating at said designated irradiation maximum irradiation power and at said designated acquisition time; processing an amplitude of said Raman response signal against a designated threshold; upon said Raman response signal being greater than said designated threshold, dynamically decreasing said designated irradiation power; and repeating for a subsequent said Raman response signal.

In one embodiment, upon said Raman response signal being below said designated threshold, the method further comprises: dynamically increasing said designated acquisition time so to increase subsequent Raman response signals toward said threshold.

In one embodiment, the Raman response signal comprises a maximum signal level for a series of initial Raman response signals.

In one embodiment, the method further comprises serially acquiring a set of background-corrected Raman response signals until a signal-to-noise ratio (SNR) thereof is greater than a designated SNR threshold.

In one embodiment, the method further comprises: acquiring a first set of background signals to process said background-corrected Raman response signals; and upon said SNR being greater than said designated SNR threshold, acquiring a complementary set of background signals such that a total number of acquired background signals is equal to a total number of said background-corrected Raman signals to be used in post-processing said background-corrected Raman signals.

In one embodiment, the method further comprises spectrally identifying and removing narrow band outliers from said Raman response signals.

In one embodiment, the method further comprises spectrally identifying an adverse safety feature in said Raman response signal and immediately suspending further acquisition.

In one embodiment, the predetermined initial irradiation power is a predetermined maximum irradiation power.

In accordance with another aspect, there is provided a non-transitory computer-readable medium having instructions stored thereon for execution by a digital data processor of a Raman system to dynamically acquire Raman signals for analyzing biological tissue by: causing irradiation of the tissue at a designated irradiation power, initially set to a predetermined initial irradiation power, and for a designated acquisition time; acquiring a Raman response signal from said irradiating at said designated irradiation power and at said designated acquisition time; processing an amplitude of said Raman response signal against a designated threshold; upon said Raman response signal being greater than said designated threshold, dynamically decreasing said designated irradiation power; and repeating for a subsequent said Raman response signal.

In one embodiment, the non-transitory computer-readable medium further comprises instructions for, upon said Raman response signal being below said designated threshold, dynamically increasing said designated acquisition time so to increase subsequent Raman response signals toward said threshold.

In one embodiment, the non-transitory computer-readable medium further comprises instructions for serially acquiring a set of background-corrected Raman response signals until a signal-to-noise ratio (SNR) thereof is greater than a designated SNR threshold.

In one embodiment, the predetermined initial irradiation power is a predetermined maximum irradiation power.

Other aspects, features and/or advantages will become more apparent upon reading of the following non-restrictive description of specific embodiments thereof, given by way of example only with reference to the accompanying drawings.

BRIEF DESCRIPTION OF THE DRAWING(S)

Several embodiments of the present disclosure will be provided, by way of examples only, with reference to several figures of the appended drawings, wherein.

Figure 1:
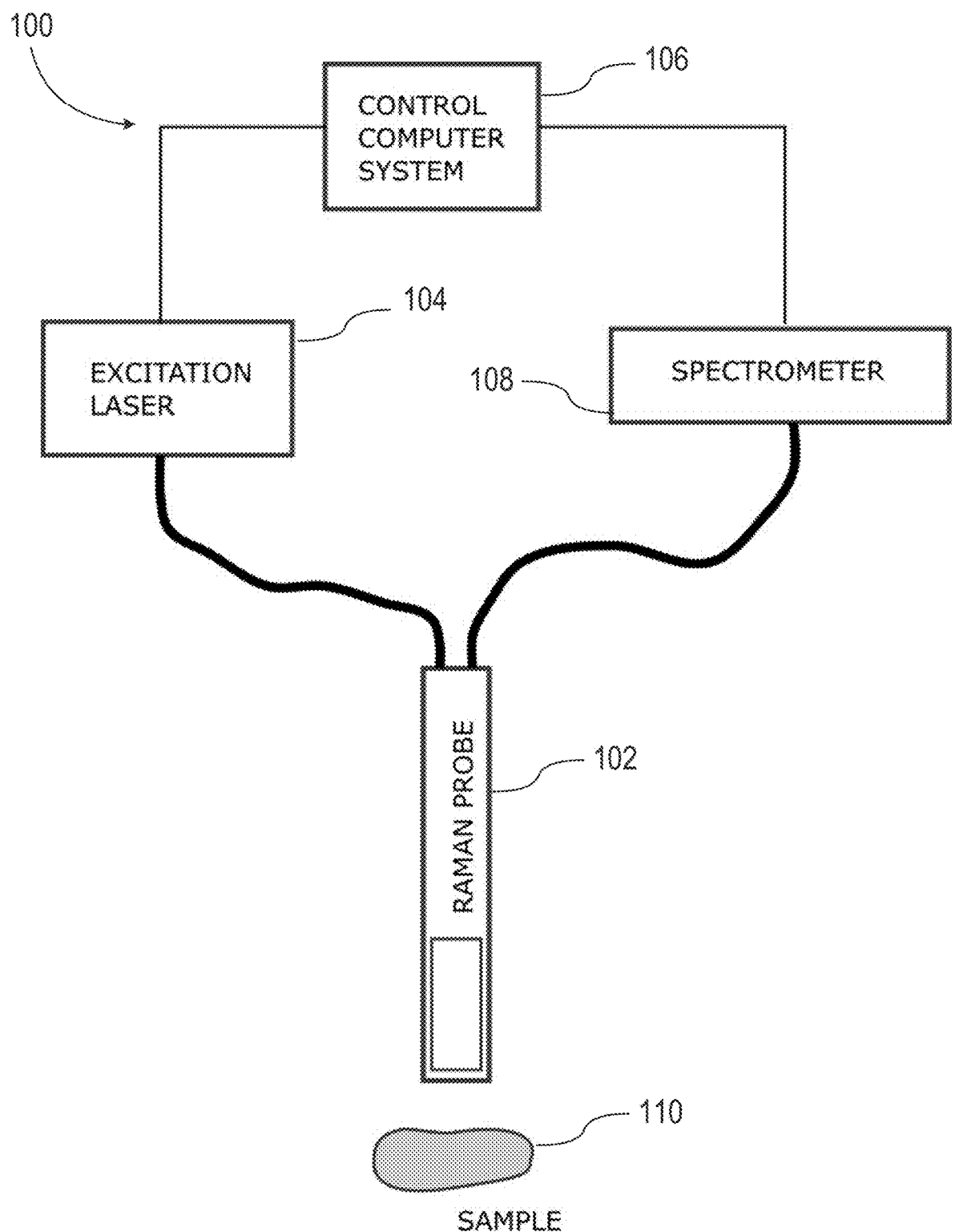
FIG. 1 is a diagram of a dynamic Raman signal acquisition system, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details below discussed. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be below described to provide examples of implementations of the system herein disclosed. No implementation below described limits any claimed implementation and any claimed implementations may cover processes or apparatuses that differ from those below described. The claimed implementations are not limited to apparatuses or processes having all of the features of any one apparatus or process described below or to features common to multiple or all of the apparatuses or processes below described. Even if an apparatus or a process below described is not an implementation of any claimed subject matter, such apparatus or such process is still encompassed by the present disclosure.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Understood is that, for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods herein described provide, in accordance with different embodiments, different examples of a dynamic Raman acquisition system and a method to be used therewith in which operational parameters, such as the excitation light source power (i.e. laser power) and/or acquisition time is dynamically optimized to ensure proper Raman measurements when operating in a dynamic environment. Raman scattering is a nonlinear effect resulting the inelastic scattering of light off a sample, said light having a shift in wavelength from a known monochromatic source. This shift is equal to the vibrational frequency of the molecular bonds in the material and may be used to identify different materials comprising an organic and/or inorganic sample. However, when taking measurements in a non-controlled operating environment like an operating room or similar, multiple sources of noise may be present (i.e. motion of handheld device, tissue variations, flickering ambient light, etc.) and their importance on the measured signal may change rapidly as a function of time and space. Hence, each new Raman measurement may find a different signal to noise ratio (SNR) in the acquired signals. Therefore, there is a need for dynamic and reliable tissue identification systems and methods using Raman spectroscopy which do not require a user to manually fine tune the acquisition parameters on-the-fly, but dynamically optimized these parameters in a way that minimizes the signal to noise ratio (SNR) for each measurement.

With reference to FIG. 1, and in accordance with one exemplary embodiment, a dynamic Raman signal acquisition system, generally referred to using the numeral 100, will now be described. In this exemplary embodiment, the system comprises a Raman probe 102, operatively connected via an optical waveguide to an excitation light source (laser) 104, and operable to direct and focus the monochromatic excitation therefrom to a biological tissue sample 110. The probe is further operable to capture the scattering light from sample 110 and direct it, via a waveguide, to a spectrometer 108 for analysis. The probe 102 may, in some embodiments, be integrated into a handheld device or similar. Spectrometer 108 may be operable to optically respond from a range of about 785-1200 nm for Stokes Raman detection with a laser excitation at 785 nm and from a range of 633-790 nm for Stokes Raman detection with a laser excitation at 633 nm, for example. The system further comprises a controller (control computer system) 106 operatively connected to both excitation light source 104 and spectrometer 108 and programmed to dynamically adjust at least one signal acquisition parameter, such as the irradiation power and/or acquisition time as a function of the measured optical response of one or multiple successive acquisitions. The controller 106 may take various forms, which may include, but is not limited to, a dedicated computing or digital processing device, microprocessor, a general computing device, tablet and/or smartphone interface/application, and/or other computing device. Furthermore, this controller 106 may further comprise a digital screen display (not shown) to at least output information about the measured Raman response.

Figure 2:
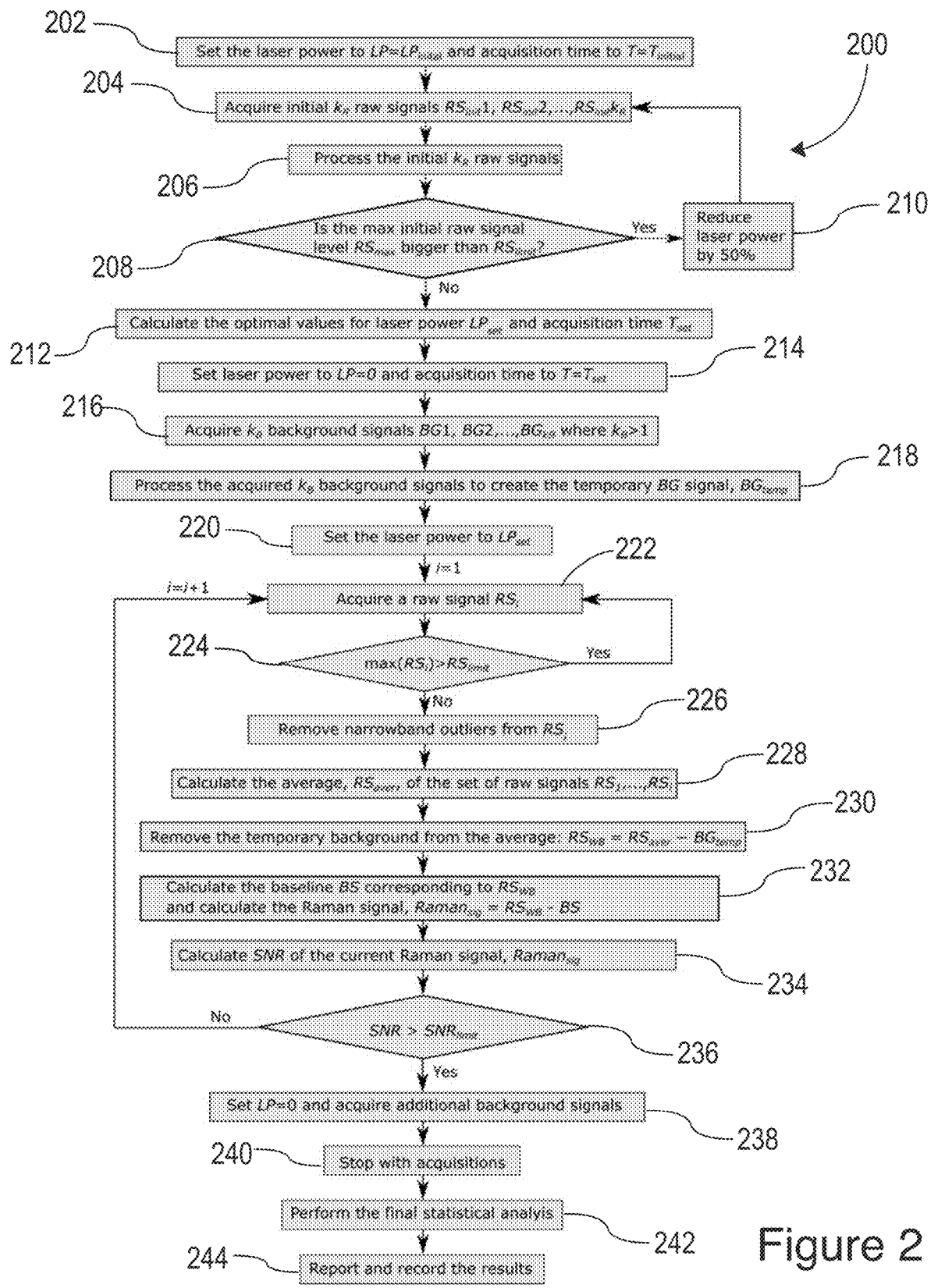
FIG. 2 is a process flow diagram of an illustrative dynamic Raman signal acquisition process, in accordance with one embodiment, in accordance with one embodiment.

With reference to FIG. 2, and in accordance with one exemplary embodiment, an illustrative dynamic Raman signal acquisition process 200 will now be described. A common problem when trying to take Raman measurements on a new unknown sample in an operating environment, such as an operating room or similar environment, is that the type of noise is not always known. Moreover, the optimal acquisition parameters may also change, depending on the time or specific location and/or orientation of the Raman probe. In some cases, for instance, metals or highly fluorescent tissue may be present, etc. As such, the method, as described in this exemplary embodiment, seeks to optimize the acquisition parameters in light of the currently experienced noise levels and local environment.

In this exemplary embodiment, the method first determines, in steps 202 to 212, the optimal excitation laser power and acquisition time operable to maximize the acquired raw signal. By "raw signal," what is meant is the optical response, characterized by a measured optical intensity vs. a Raman shift (in cm$^{-1}$), as captured by the probe when the sample is irradiated. This raw signal includes contributions from the Raman signal, but also a fluorescence contribution, an ambient light contribution, and multiple noise contributions, which include readout noise, dark noise (due to thermal excitations), shot noise (photon counting noise), cosmic rays, etc. Initially (step 202), both the laser power and acquisition time are set to an initial known value. For biological in-vivo applications, the laser power cannot exceed safety limit for the tissue that is being interrogated. One such guideline for laser intensity safety limits is given in Matthes, R., et al. "Revision of guidelines on limits of exposure to laser radiation of wavelengths between 400 nm and 1.4 mu m." *Health Physics* 79.4 (2000): 431-440, the entire contents of which are hereby incorporated herein by reference. These initial values may be determined beforehand by the user or programmed into controller 106. The system then acquires iteratively $k_R$ initial raw signals $RS_{init}$ (step 204), wherein each initial raw signal is further processed (step 206) to determine the maximum signal level value ($RS_{max}$) that is expected to be measured using the current initial acquisition parameters. The method then checks to see if this $RS_{max}$ value is larger than a maximum allowable signal limit ($RS_{limit}$) (step 208). If the measured maximum (estimated) initial raw signal value ($RM_{max}$) is deemed to be too large, the system reduces the laser power by 50% (step 210) and again acquires another set of $k_R$ initial raw signals (steps 204-208). If not, the system then uses the $RS_{max}$ value to determine (step 212) the optimal values of the acquisition parameters (laser power ($LP_{set}$) and acquisition time ($T_{set}$)) to be used for the following real data acquisition process.

In the steps 214 to 218, a temporary background signal ($BG_{temp}$) is generated. This $BG_{temp}$ is used in the iterative acquisition process of following steps 220 to 236. In the presently discussed embodiment, the background signal comprises both the dark spectrum (accumulated dark current) and ambient light contributions to the measured raw signal. The dark spectrum is generated by the accumulation of thermally excited electrons (e.g. dark current) in the Raman's probe detector. It is dependent not on illumination intensity but on the detector's temperature and exposition time. Ambient light sources may include any source of electromagnetic radiation overlapping with the detection range of the system, such as surgical lights that provide lighting in and around the operative field, conventional fluorescent light sources used to light-up the room, windows with a view to the exterior of the operating room or similar. To remove these contributions, the laser is turned off (step 214) and a series of $k_B$ background signal measurements are made (step 216) with the same integration time as a tissue measurement. This series of temporary background signals are processed to create a temporary representative background signal $BG_{temp}$ (step 218). This $BG_{temp}$ is used for subtraction from all subsequent raw signal acquisitions to be recorded under similar conditions.

After optimizing the acquisition parameters ($LP_{set}$, $T_{set}$) and acquiring the temporary background signal $BG_{temp}$, the main acquisition loop may be started (steps 220 to 236). The laser power is first set to the previously calculated optimal value $LP_{set}$ (step 220) before beginning the measurement loop. This starts with the acquisition of a first raw signal $RS_i$. This signal is then analyzed in case the maximum signal value measured is larger than the maximum allowable signal strength (step 224). If this is the case, then step 222 is repeated, if not, the raw signal $RS_i$ may be further processed. To do so, the narrowband outliers are removed (step 226). These narrowband outliers are commonly produced by ambient cosmic rays that are detected and produce a very narrow spike or peak in the signal (spectrum) that does not correspond to a Raman emission. The techniques used to remove these spikes are well known in the art. Once all the narrowband outliers are removed, the signal $RS_i$ is then used with the set of all previously taken raw signals (1 to i−1) to produce an averaged raw signal $RS_{aver}$ (step 228). The temporary background signal is then subtracted (step 230) from this averaged raw signal to produce a $RS_{WB}$ ("without background") signal. Next, the baseline (BS), which represents the fluorescence contribution to the signal is identified and subtracted to produce the final Raman signal ($Raman_{sig}=RS_{WB}$−BS) for the current iteration (step 232).

In one embodiment, the step 232 of extracting Raman spectra from raw signals by removing baselines can be defined as follows. The baseline originates mostly from fluorescence that gets co-excited with Raman signal. In case of tissues, the fluorescence signal is typically strong so extracting a weak Raman spectrum can be a challenge. Many algorithms are used for baseline removal. An example of such an algorithm can be found in Zhao, Jianhua, et al. "*Automated autofluorescence background subtraction algorithm for biomedical Raman spectroscopy.*" Applied spectroscopy 61.11 (2007): 1225-1232. Most of these baseline removal algorithms are based on the general approach: (1) An optional first step is to remove high frequency noise and outliers from the raw signal; (2) Make an initial estimate for the baseline; (3) Then iteratively repeat the next two steps until a predefined convergence criterium is satisfied: (a) Calculate the deviation of the estimated baseline from the signal using a predefined cost function; (b) Based on the cost function values, estimate the new baseline function.

A suitable specific efficient baseline removal strategy is described for the present disclosure; but other baseline removal algorithms can be used as well. All signals are represented as vectors of size N where N is typically the number of spectrometer detector pixels across the spectroscopic axis or smaller than that in case some parts of spectra are purposely truncated because they don't carry useful information. The indices i for the defined quantities run in the range (1, . . . , N). If $y_i$ is a raw signal then optimal baseline $b_i$ minimizes the cost function:

$$L(b)=\Sigma_{k=1}^{N}\varphi(b_i-Fy_i) \quad (1)$$

discussed in Mazet, Vincent, et al. "Background removal from spectra by designing and minimising a non-quadratic cost function." Chemometrics and intelligent laboratory systems 76.2 (2005): 121-133. The cost function is given by:

$$\varphi(x) = \begin{cases} x^2 & \text{if } x < s \\ s^2 & \text{otherwise} \end{cases} \quad (2)$$

with s is a constant of our choosing and normally taken as zero. The filter F is a filter with some parameters of our choosing. Savitzky-Golay filter is confirmed as a good choice in most of the cases and which has been confirmed by other authors as well (e.g. Chen, Kun, et al. "Improved Savitzky-Golay-method-based fluorescence subtraction algorithm for rapid recovery of Raman spectra." Applied optics 53.24 (2014): 5559-5569.). The degree and number of channels for Savitzky-Golay filter can be optimized for the particular class of Raman signals that are being investigated. For tissues, degrees of one or two; and a number of channels between 50 and 100 usually provide satisfactory results. The iterative steps (a) and (b), as above described, can be defined in this case as:

$$b_i^k = Fs_i^k \quad (3)$$

$$s_i^{k+1} = \begin{cases} y_i & \text{if } y_i < b_i^k \\ b_i^k & \text{if } b_i^k < y_i \end{cases} \quad (4)$$

where k is the iterative step and so is defined as the output of the opening operator (the opening operator is defined below) applied on raw signal $y_i$. The raw signal can be preprocessed beforehand to remove outliers and high frequency noise as mentioned above. The opening operator is defined with its window size W (must be odd) and this set of operations applied on signal $y_i$, as follows:

---

M = (W − 1)/2
Eroded = Opened = y
for M ≤ i ≤ N − M − 1 do
   Interval = i − M:i + M
   Eroded(i) = $\min_{j \in Interval} y$
end
for M ≤ i ≤ N − M − 1 do
   Interval = i − M:i+M
   Opened(i) = $\max_{j \in Interval}$Erroded
end

---

The implementation window size W is typically in the range of 50 to 100. More details about general aspects of Savitzky-Golay filter application can be found in Orfanidis, Sophocles J. Introduction to Signal Processing. Englewood Cliffs, N.J.: Prentice-Hall, 1996.

The signal to noise ratio (SNR) is calculated on this $Raman_{sig}$ at the wavelength shift of interest (step 234) and compared to the pre-determined desired threshold of $SNR_{limit}$ (step 236). That the SNR is calculated, in this embodiment, at every acquisition iteration ensures efficiency, performing unnecessary acquisitions is avoided in the case where the SNR is already found to be acceptable. If this is the case, the method then proceeds to the next step. Instead, if the SNR is found to be unsatisfactory (smaller than $SNR_{limit}$), the method, via the system, proceeds once more with a new acquisition iteration i+1 (steps 222 to 236).

Once the SNR is satisfactory, the laser power is turned off once more and an additional series of background signals are measured (step 238) to create an averaged background with a reduced noise level. This is done to ensure that as many background signals have been acquired as the number of signal acquisitions, so that the noise levels in both sets are comparable. Once this is done, the acquisition phase is over (step 240) and only the post-acquisition analysis steps remain.

In the post-acquisition analysis, the final Raman signal and the final set of background signals are processed to produce a final statistical analysis (step 242). This analysis produces the final Raman spectra (signal intensity vs Raman shift in $cm^{-1}$) and may use additional techniques, such as Laplacian transforms, to help identify the one or more Raman spikes characteristic of the sample being irradiated. Furthermore, the results may be shown in the form of one or more graphs (including 3D graphs) or the like. Finally, the system may then report and record the results (step 244).

Figure 3A:
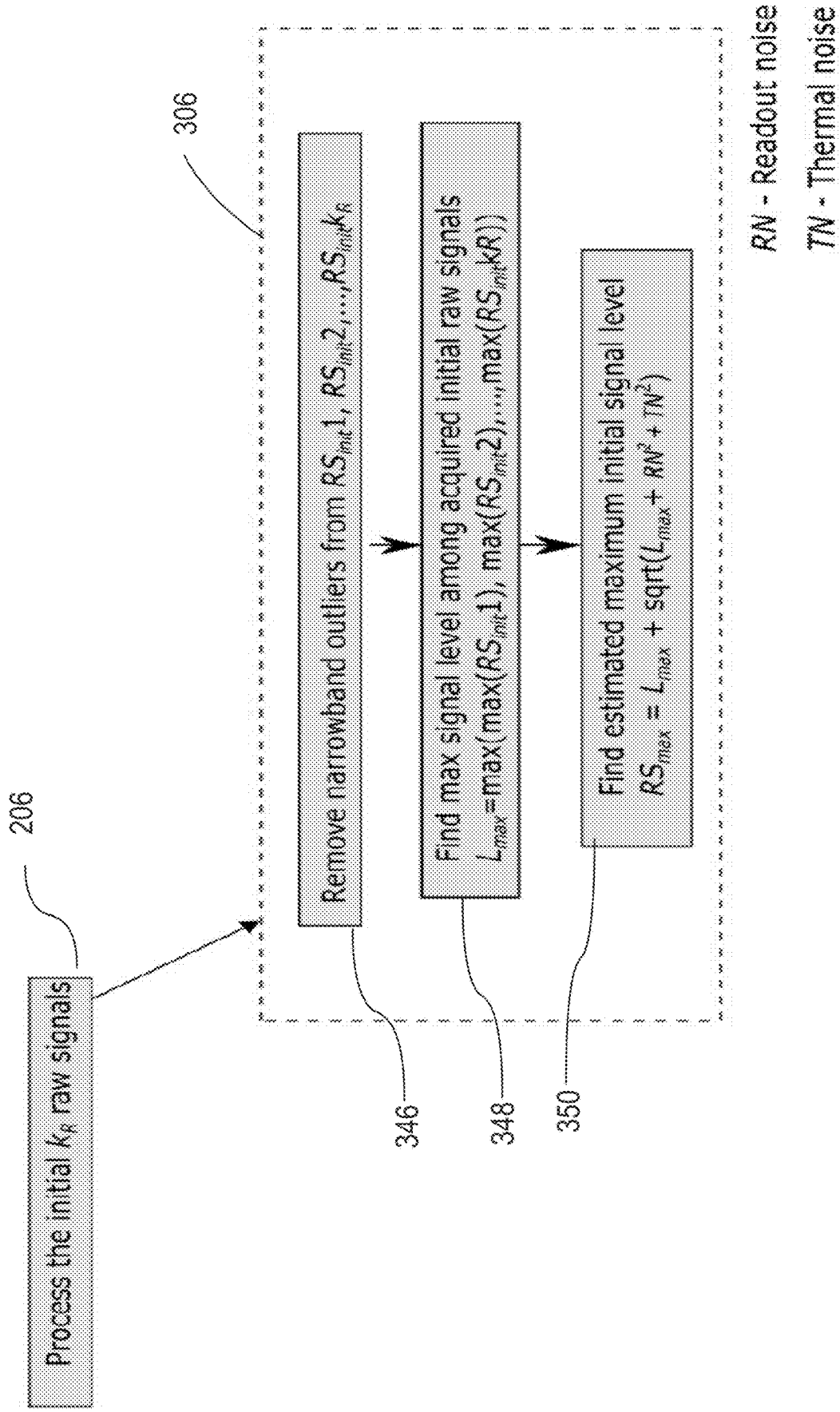
FIG. 3A is a process flow diagram of an exemplary process for estimating a maximum initial signal level in the dynamic Raman signal acquisition process of FIG. 2.
Figure 3B:
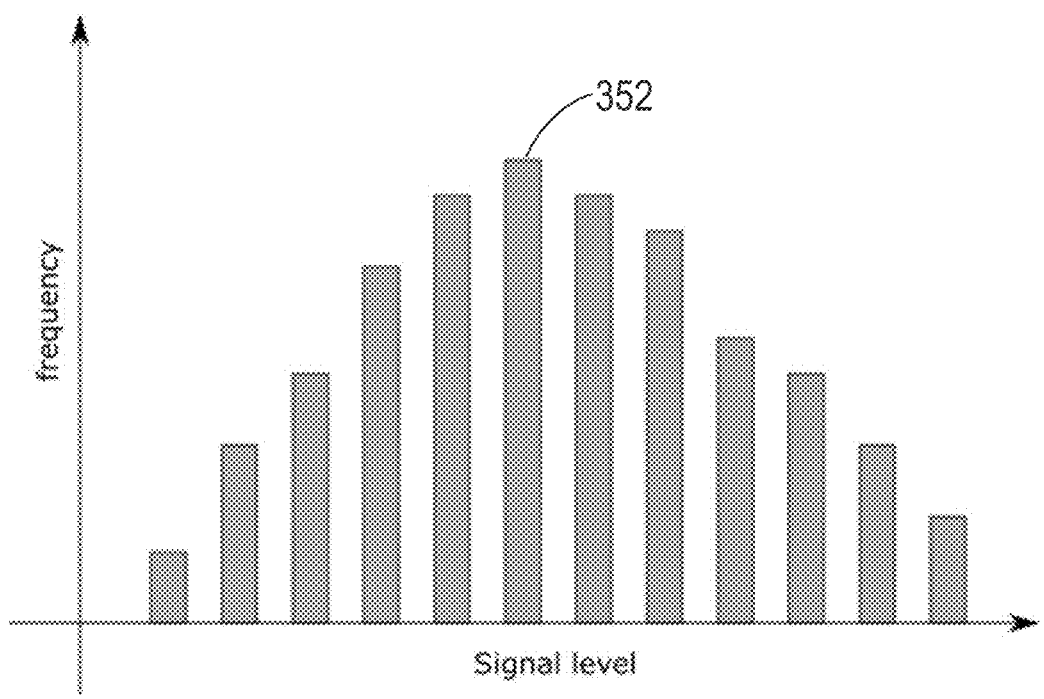
FIG. 3B is an approximate histogram of Raman signals for a particular wavelength in the presence of random noise where the random noise is a combination of shot noise, thermal noise, and readout noise.

With reference to FIGS. 3a and 3b, and in accordance with one exemplary embodiment, an exemplary process 306 for estimating a maximum initial signal level in the dynamic Raman signal acquisition process of FIG. 2 will now be described. In this exemplary process, the set of $k_R$ initial raw signals acquired in step 204 of FIG. 2 are first processed (step 346) to remove any narrowband outliers (e.g., cosmic rays contribution). Once this is done, the resulting signals are analyzed (step 348) to extract the maximum signal level found in each one. Since only a limited number of raw signals are acquired during this phase, statistically possible is that an arbitrary raw signal acquired for this set of acquisition parameters is larger than the maximum signal level from the initial limited set of raw signals. This is due to random noise composed of shot noise, thermal noise, and readout noise that is superimposed on the signals which can be artificially increased or decreased in this way. Shot noise, thermal noise, readout noise, and estimates of their values are ascertainable. These noise estimates can be used to set upper limits for raw signals based on a limited set of raw signals. The estimates for readout noise and thermal noise are provided by the optical detector manufacturer and the estimate for the shot noise related to a signal level L is given with sqrt(L). Since the thermal noise, TN, readout noise, RN, and the shot noise are independent from each other, they are added in quadrature to create an estimate (step 350) for the upper limit of the acquired raw signals within one standard deviation:

$$RS_{max} = L_{max} + \text{sqrt}(L_{max} + RN^2 + TN^2).$$

An alternative way to create an estimate for RSmax in cases where additional sources of random noise may be present is to perform a study prior to measurements which includes acquiring a large number of raw signals for a given set of acquisition parameters and creating a histogram 352 as shown in FIG. 3b. The histogram data can provide an estimate for typical uncertainties involved in raw signal acquisitions.

Figure 4:
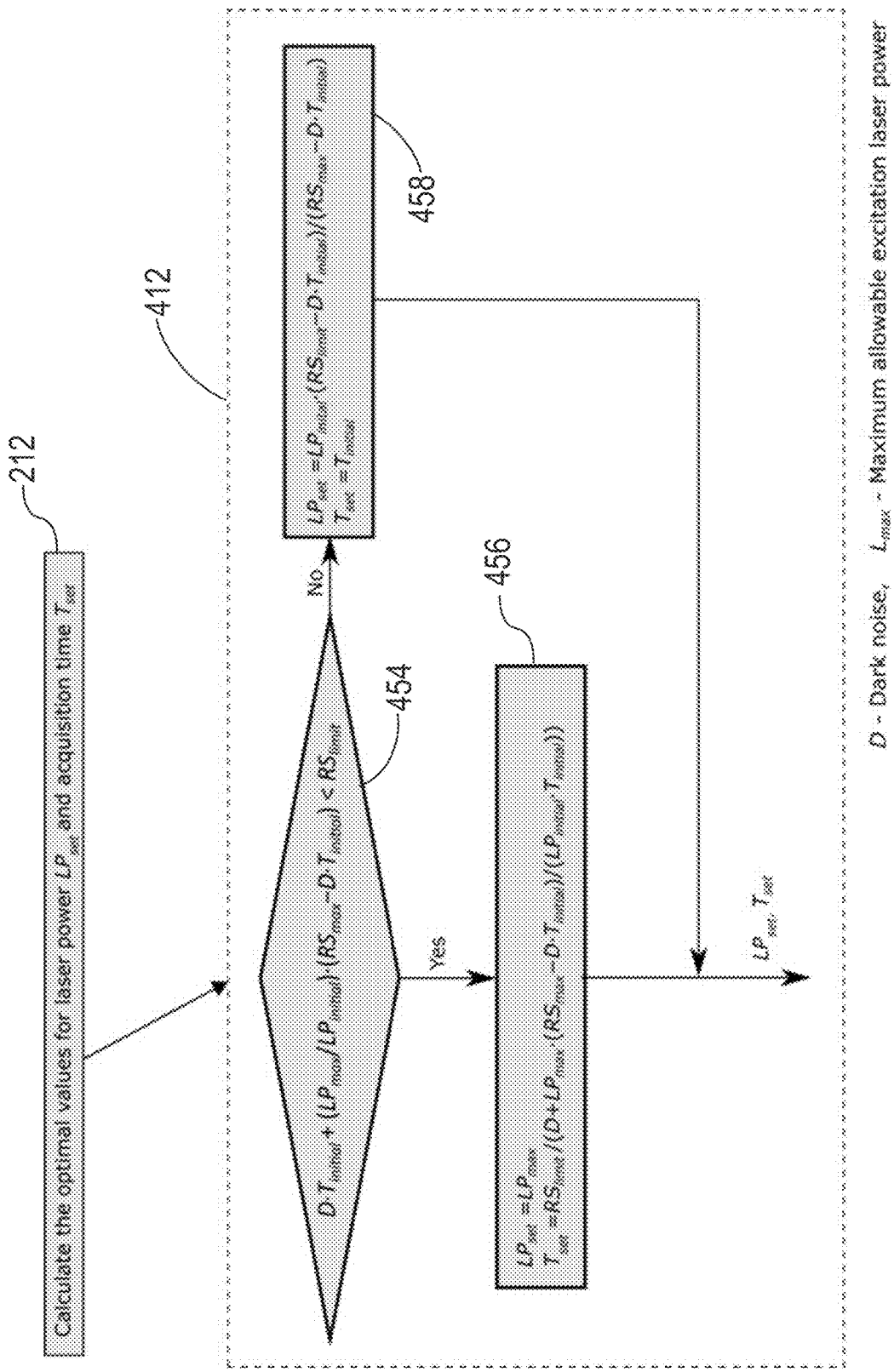
FIG. 4 is a process flow diagram of an exemplary acquisition parameter optimization process in the dynamic Raman signal acquisition process of FIG. 2, in accordance with one embodiment.

With reference to FIG. 4, and in accordance with one exemplary embodiment, an exemplary acquisition parameter optimization process 412 in the dynamic Raman signal acquisition process of FIG. 2 will now be described. In this exemplary embodiment, the process assumes that the acquired signal strength RS, from which the dark current contribution has been subtracted, is directly proportional to both the excitation laser power (LP) and the acquisition time (T). Using these linear relationships, estimating the optimized values for these two operational parameters during the acquisition process ($L_{set}$, $T_{set}$) from at least one previous measurement done with initial values ($L_{ini}$, $T_{ini}$) is then possible. These optimized values are chosen to maximize the signal level without exceeding the maximum allowable signal level ($RS_{limit}$).

Two cases may be identified. To identify which case is relevant to the present acquisition, the system first extrapolates (step 454) from the initial max signal level acquired ($RS_{max}$) at the initial laser power ($LS_{ini}$) the raw signal level expected to measure if the maximum laser power ($LP_{max}$) is used. In the first case, using the maximum allowable laser power ($LP_{max}$) is found to lead to a maximum signal level ($LP_{max}$) that is smaller than the maximum allowable signal level ($RS_{limit}$):

$$\frac{(RS_{max} - D \cdot T_{ini})}{(RS_{limit} - D \cdot T_{ini})} < \frac{LP_{ini}}{LP_{max}} \text{ or}$$

$$D \cdot T_{initial} + (LP_{max} / LP_{initial}) \cdot (RS_{max} - D \cdot T_{initial}) < RS_{limit}$$

where D is the dark current, $T_{ini}$ is the initial acquisition time and $D \cdot T_{ini}$ gives the accumulated dark spectra contribution to the measured raw signal. If this inequality is true, then (step 456) the laser power may be safely set to maximum ($LP_{set} = LP_{max}$) and the acquisition time is increased to maximize the acquired raw signal level to $RS_{limit}$. As mentioned above, assuming a proportional relationship between the acquisition time and signal level acquired, the acquisition time may be set to:

$$T_{set} = RS_{limit}/(D + LP_{max} \cdot (RS_{max} - D \cdot T_{initial})/(LP_{initial} \cdot T_{initial})).$$

In the second case (i.e. the above inequality is found to be false), extrapolating from an initial raw signal measurement shows that using the maximum laser power would lead to a signal level higher than $RS_{limit}$. In this case (step 458), the acquisition time is kept the same ($T_{set} = T_{ini}$) but here the laser power ($LP_{set}$) is set, again assuming a proportional relationship between RS and LP, to a value lower than $LP_{max}$, but estimated to lead to the maximum allowable signal ($RS_{limit}$):

$$LP_{set} = LP_{initial}(RS_{limit} - D \cdot T_{initial})/(RS_{max} - D \cdot T_{initial}).$$

Figure 5:
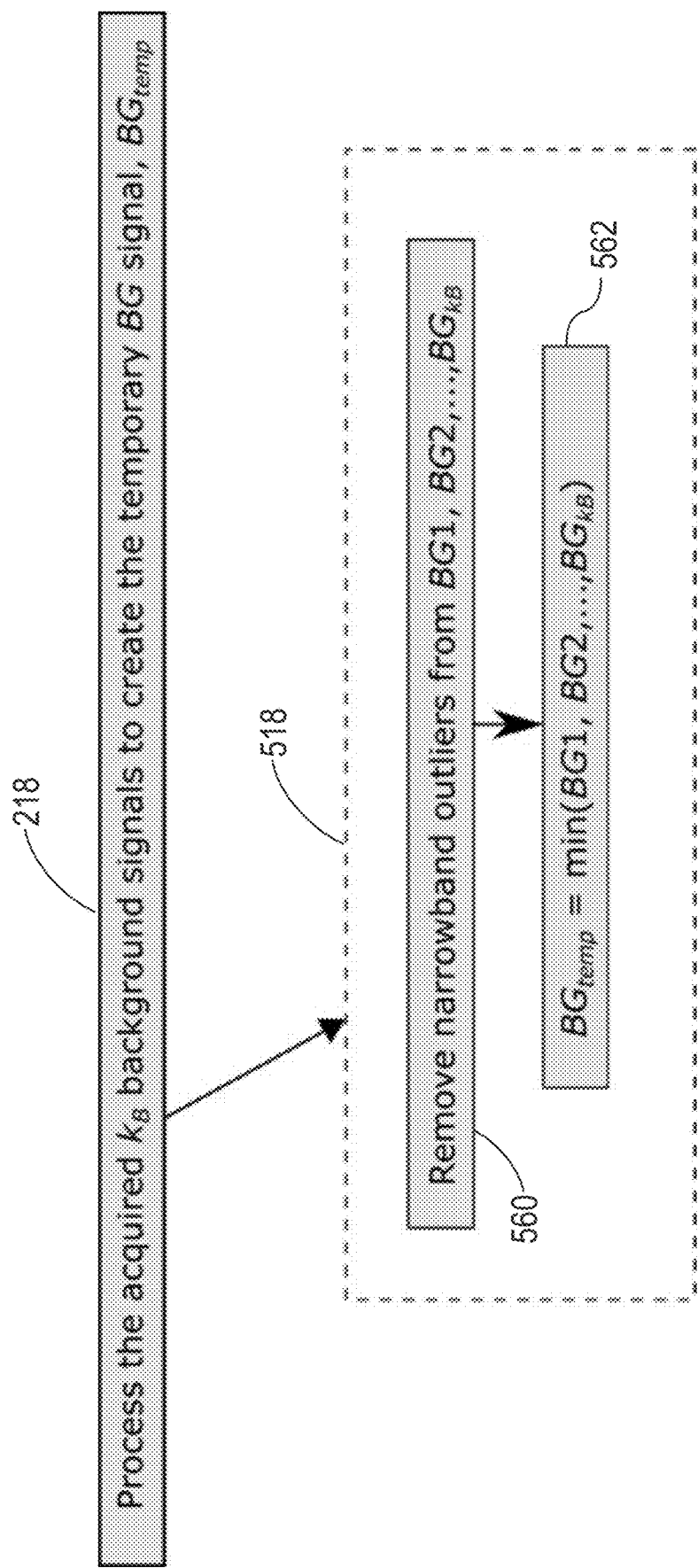
FIG. 5 is a process flow diagram of an exemplary temporary background signal process in the dynamic Raman signal acquisition process of FIG. 2, in accordance with one embodiment.

With reference to FIG. 5, and in accordance with one exemplary embodiment, an exemplary temporary background signal process in the dynamic Raman signal acquisition process of FIG. 2 will now be described. In this exemplary embodiment, the step 218 of FIG. 2 is expanded to include the set of steps 518 comprising steps 560 and 562. In step 560, each of the $k_B$ background signals acquired in step 216 of FIG. 2 are processed to identify and remove any narrowband outliers such as those created by cosmic rays. The $k_B$ background signals are then compared to one another to find the one indicative of the smallest signal strength, which is used to define the temporary background signal $BG_{temp}$ (step 562). BGtemp is not a single value, but covers the full spectral range. Min ( ) in this context indicates that the value of BGtemp, for each wavenumber (or wavelength), is equal to the minimal value among BG1, BG2, ... , BGkb values at that wavenumber as picking-up external unstable noise, i.e. flickering of fluorescence bulbs, is possible, which would otherwise create an artifact in the background signals. Instabilities, such as light bulb flickering, are addressed in the main iterative loop, since more complex algorithms may be needed to distinguish such artifacts from genuine Raman signals.

Figure 6:
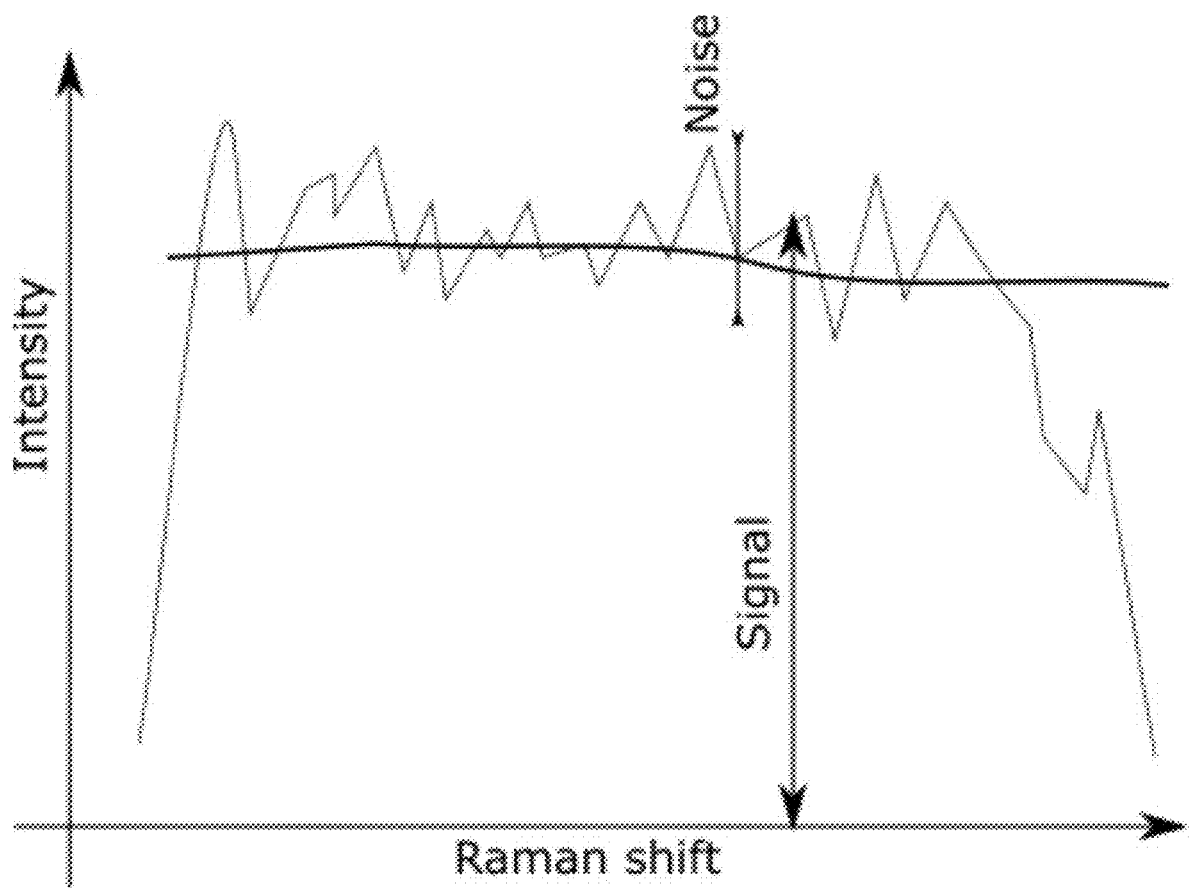
FIG. 6 is a schematic diagram illustrating a distinction between signal intensity and noise intensity, in accordance with one embodiment.

With reference to FIG. 6, and in accordance with one exemplary embodiment, a distinction between signal intensity and noise intensity will now be described. In general, the intensity measured at a given Raman shift ($cm^{-1}$) comprises contributions from the Raman response to which is added a multiplicity of noise sources contribution. As above mentioned, these noise sources include readout noise, shot noise, dark noise, etc. Readout noise is caused by electronic noise in the detector output stage and related circuitry, which largely dictates the detection limit of the spectrometer. Shot noise is associated with the statistical variation in the number of photons incident on the detector, which follows from a Poisson distribution. Dark noise (dark current) is associated with the statistical changes in the number of thermally generated electrons in the detector with the excitation source turned off. In FIG. 6, the dark horizontal line represents the average intensity of the signal that is obtained by averaging over multiple acquisitions.

Figure 7:
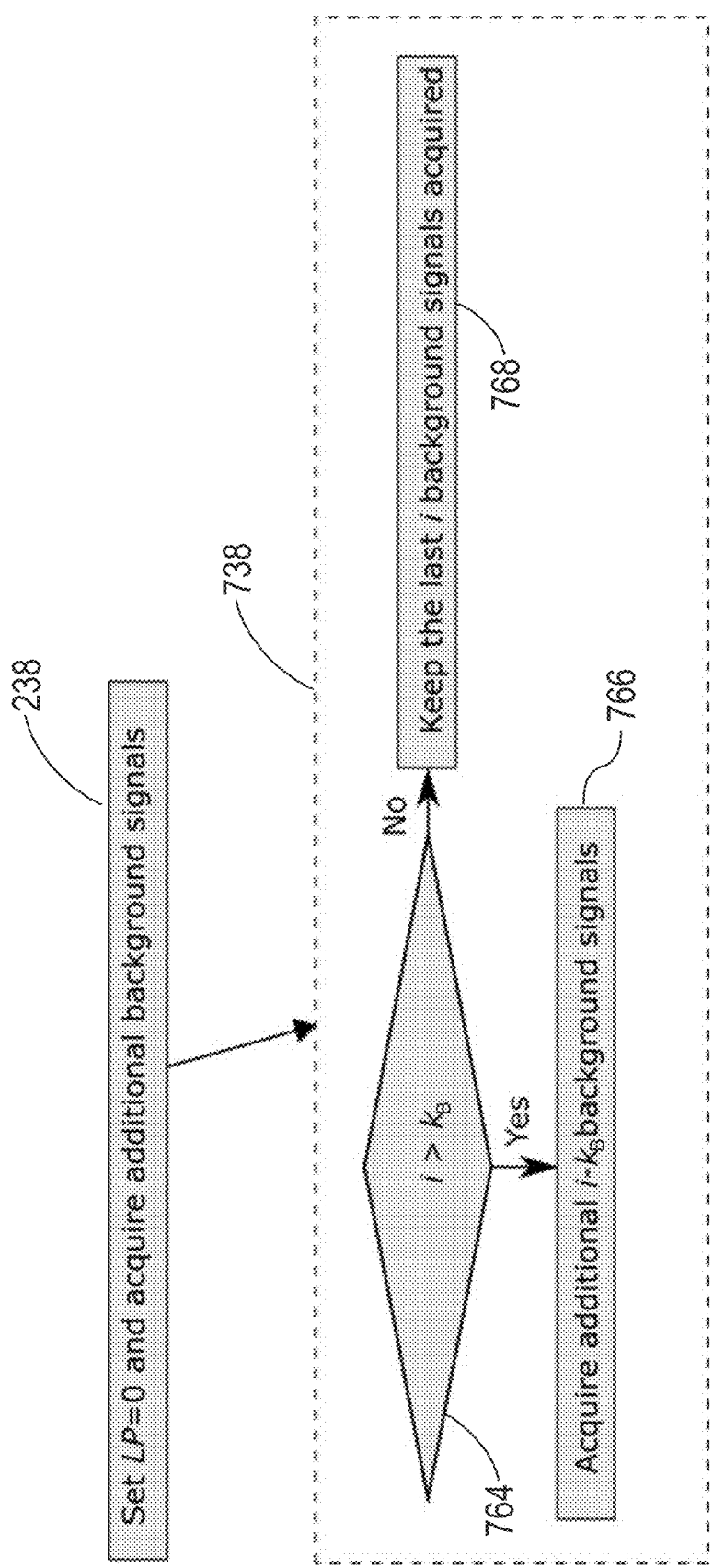
FIG. 7 is a process flow diagram of an exemplary final background signal process following the temporary background signal process of FIG. 5, in the dynamic Raman signal acquisition process of FIG. 2, in accordance with one embodiment.

With reference to FIG. 7, and in accordance with one exemplary embodiment, an exemplary final background signal process following the temporary background signal process of FIG. 5, in the dynamic Raman signal acquisition process of FIG. 2 will now be described. As above mentioned, acquiring at least as many background signals as the number of Raman acquisitions is important, because similar levels of confidence in both types of signals for the post-acquisition statistical analysis are needed. In this exemplary embodiment, step 238 of FIG. 2 is expanded to include the process 738. Herein, the method first checks (step 764) to see if the total number of acquisition (i) done in steps 222 to 236 of FIG. 2 is larger than the total number of temporary background signals acquired ($k_B$) in steps 216 of FIG. 2. If this is the case, then the method, via the system, proceeds with the acquisition of an additional (i–$k_B$) background signals (step 766). If not, then only the last i temporary background signals are kept (step 768). Either way, only an equal number of background signals and raw signals are used.

Figure 8:
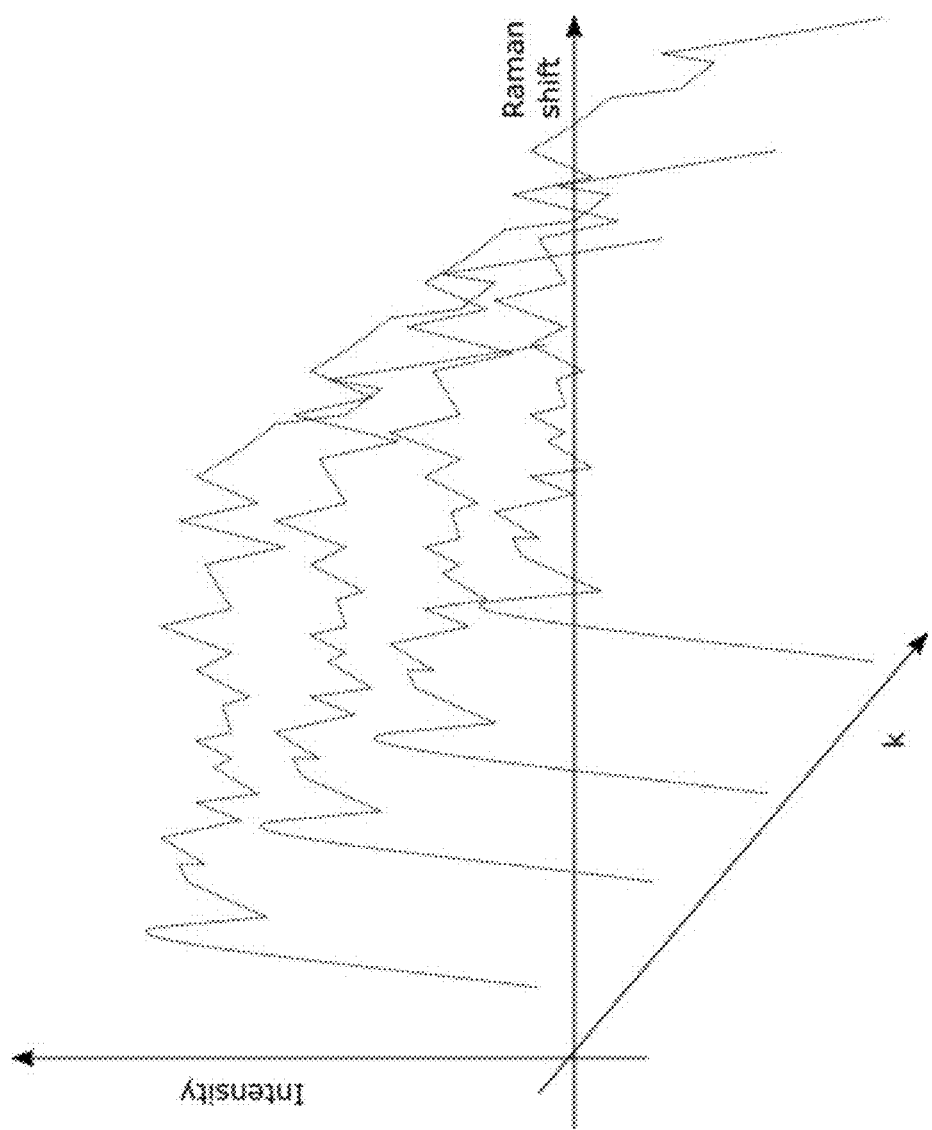
FIG. 8 is a schematic diagram illustrating a series of Raman response signals acquired over time, in accordance with one embodiment.

With reference to FIG. 8, and in accordance with one exemplary embodiment, an example of a series of Raman response signals acquired over time will now be described. FIG. 8 shows different collection of successive signals (k=1, 2, 3 . . . ) acquired over time, each signal similar to the one shown in FIG. 6. This illustrates the large noise variation that may be found in each acquisition, but that the noise may be averaged out to reveal the underlying signal (dark horizontal line in FIG. 6).

Figure 9:
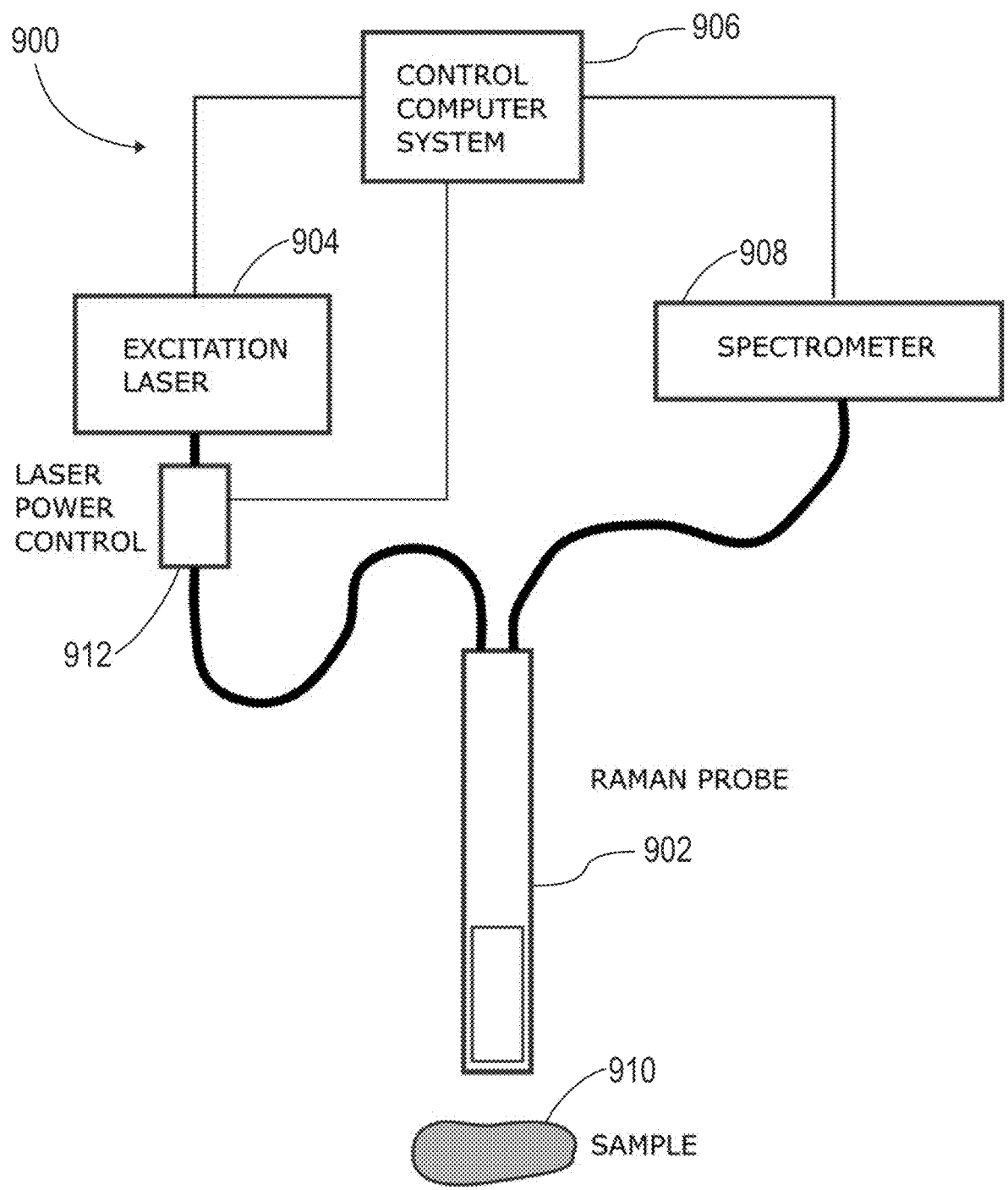
FIG. 9 is a diagram of a dynamic Raman signal acquisition system, in accordance with another embodiment.

With reference to FIG. 9, and in accordance with one exemplary embodiment, a dynamic Raman signal acquisition system 900 will now be described. In this exemplary embodiment, similarly to the one shown in FIG. 1, the system again comprises a Raman probe 902, operatively connected via an optical waveguide to an excitation light source (laser) 904, and operable of directing and focusing the monochromatic excitation therefrom to a biological tissue sample 910. The probe is further operable to capture the scattering light from sample 910 and directing it, via a waveguide, to a spectrometer 908 for analysis. The probe 902 may, in some embodiments, be integrated into a handheld device or similar. Spectrometer 908 may be operable to optically respond from a range of about 785-1200 nm for Stokes Raman detection with a laser excitation at 785 nm and from a range of 633-790 nm for Stokes Raman detection with a laser excitation at 633 nm. The controller 906 may take various forms, which may include, but is not limited to, a dedicated computing or digital processing device, microprocessor, a general computing device, tablet and/or smartphone interface/application, and/or other computing device as may be readily appreciated by the skilled artisan. Furthermore, this controller 906 may further comprise a digital screen display (not shown) to at least output information about the measured Raman response. In addition, this exemplary embodiment further comprises a laser power control device 912, usually comprising a mechanical shutter and/or optical modulator, operatively connected to controller 906 and connected to the optical waveguide at the output of the excitation light source 904. This laser power control device 912 is operable to modulate the irradiation power incident on sample 910 without the need to turn on and off the light source 904 itself. This laser power control device is also operationally linked to controller 906 and may be controlled therefrom as a function of the data acquired by spectrometer 908.

Figure 10:
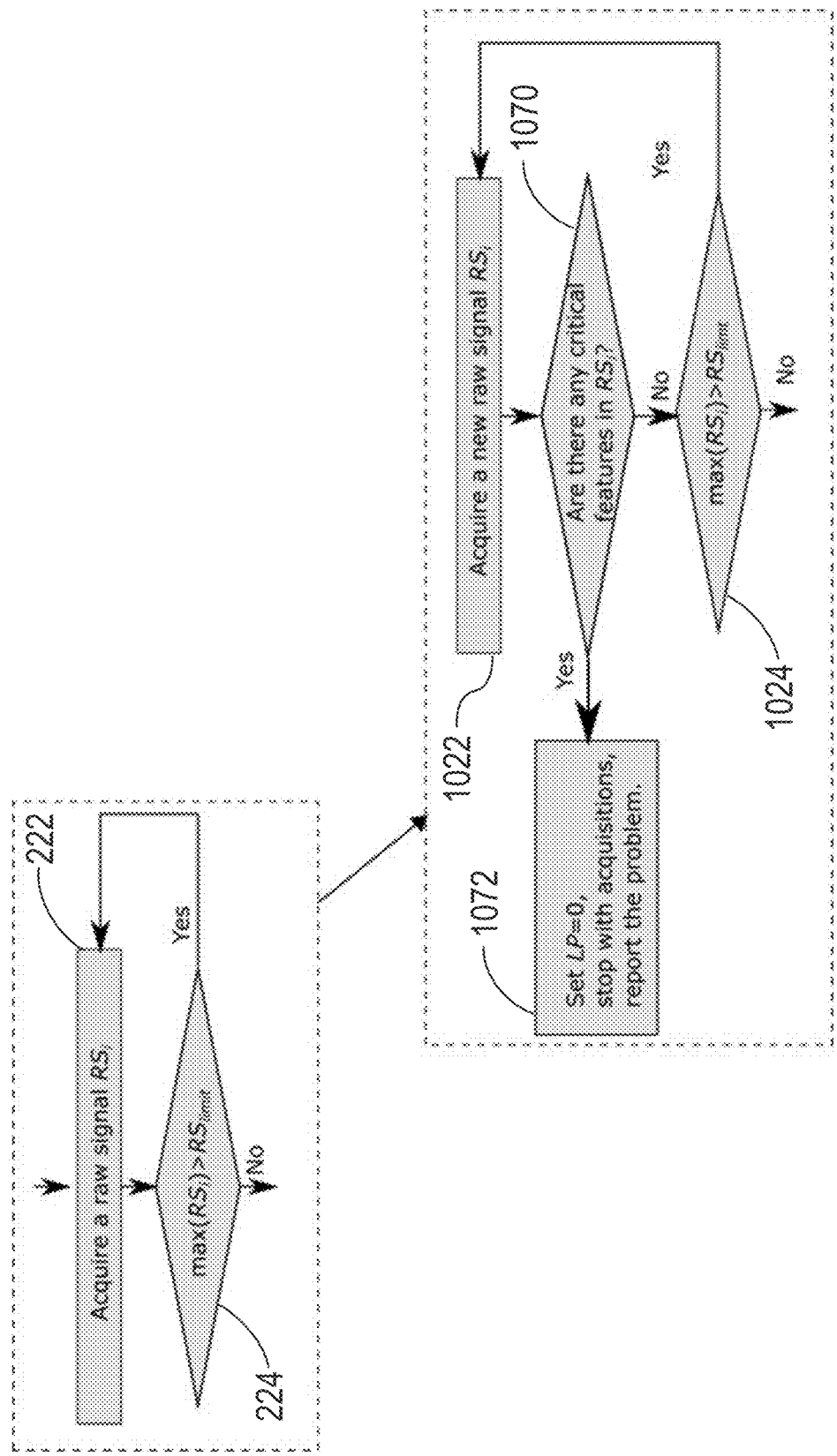
FIG. 10 is a process flow diagram of an exemplary safety shutdown process of the dynamic Raman signal acquisition process of FIG. 2, in accordance with one embodiment.

With reference to FIG. 10, and in accordance with one exemplary embodiment, an exemplary safety shutdown process of the dynamic Raman signal acquisition process of FIG. 2 will now be described. In this embodiment, steps 222 and 224 of FIG. 2 are further detailed. As in the original step 222, in step 1022 a new raw signal $RS_i$ is acquired. This new raw signal is now analyzed to find if it contains any critical features (step 1070) representative of hazardous chemicals and/or materials produced by burning tissue. In some embodiments, a list of critical features to look may be stored in a database accessible to the system's controller. If the system does detect the presence of any critical features, then the acquisition process is stopped completely, the laser power is set to zero (LP=0) and the problem is reported to the user (step 1072). If not, then the system checks to see if the maximum value found in $RS_i$ (step 1024) is higher than the raw signal limit ($RS_{limit}$). If this is the case, the system goes back to step 1022 and acquires a new raw signal $RS_i$. In the opposite case, $RS_i$ is deemed to be acceptable and the process continues to step 226 of FIG. 2.

Figure 11:
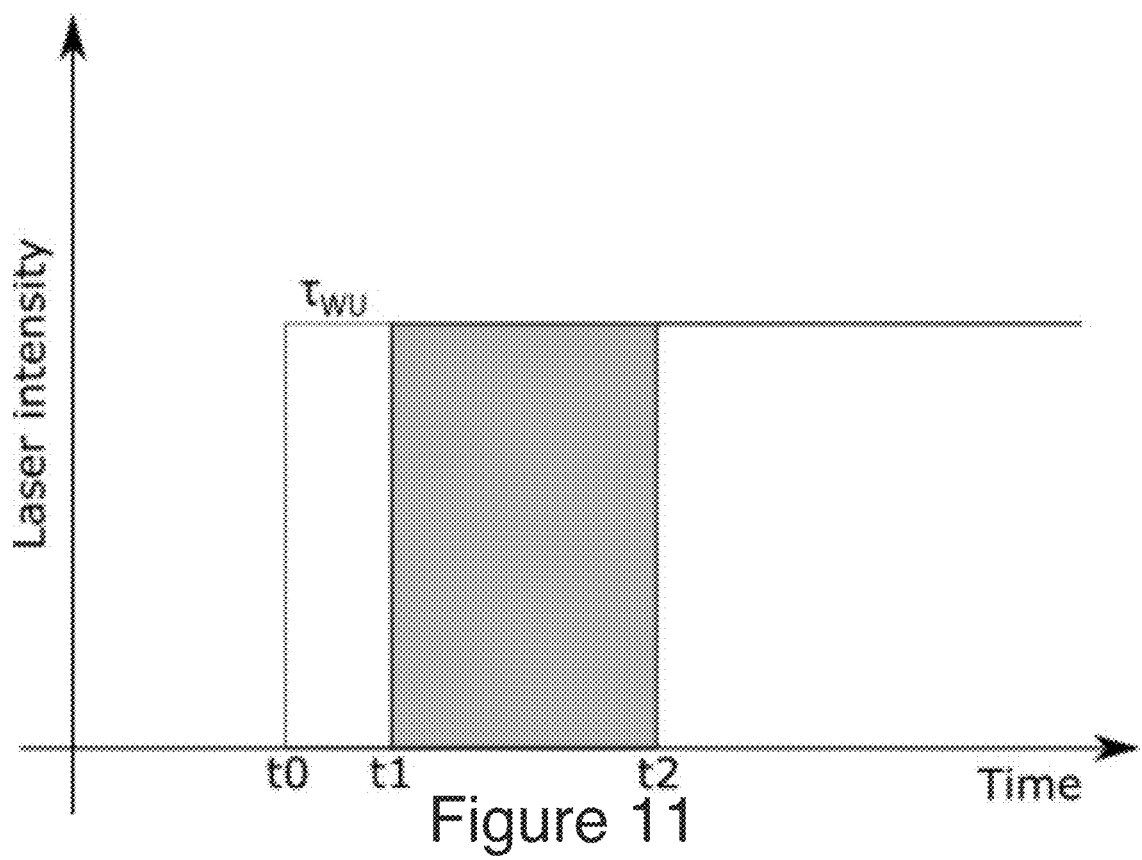
FIG. 11 is a schematic diagram of an irradiation intensity over time for a given acquisition window, in accordance with one embodiment.

With reference to FIG. 11, and in accordance with one exemplary embodiment, an example of an irradiation intensity over time for a given acquisition window will now be described. In general, the excitation laser may have a turn-on delay period. This is illustrated in FIG. 11, wherein the excitation laser is turned on at $t_0$, but the laser intensity only increases to a stable value after a wait time of $\tau_{wu}$ at $t_1$. To avoid this long delay, in some embodiments, using a mechanical shutter and/or a modulator, instead of turning the excitation light source on and off, is useful.

Figure 12:
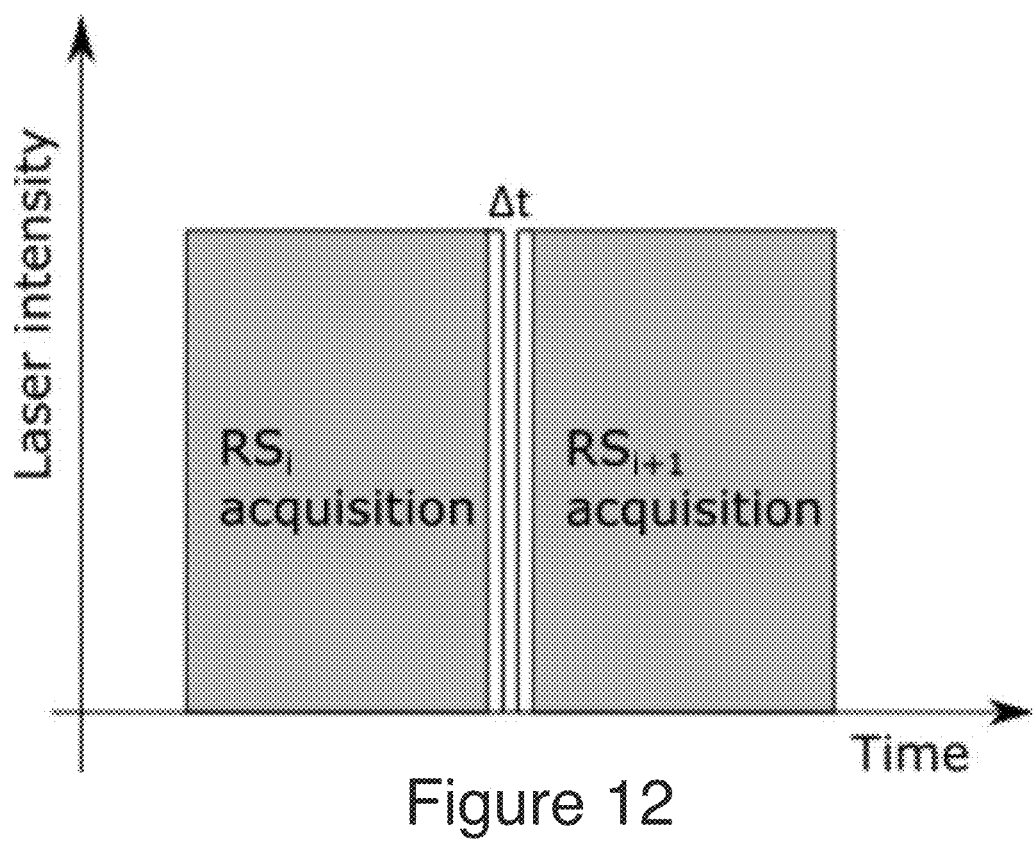
FIG. 12 is a schematic diagram of an irradiation intensity over time for a set of sequential acquisition windows, in accordance with one embodiment.

With reference to FIG. 12, and in accordance with one exemplary embodiment, an example of an irradiation intensity over time for a set of sequential acquisition windows will now be described. FIG. 12 shows the change with respect to time of the irradiation intensity on the sample for two consecutive acquisitions. We see that there is a time delay of Δt between acquisition i and acquisition i+1. This is done to avoid photobleaching or fluorescence quenching. Photobleaching is a process wherein the acquired signal intensity associated with the background fluorescence is reduced by prolonged exposure to the excitation radiation. Photobleaching is sometimes used to remove the fluorescence background from the acquired signal to improve the signal to noise ratio of the Raman measurements. However, photobleaching may be undesirable as it may lead to sample damage, long acquisition times and it may introduce new unknown noise sources to the measured signal. As such, avoiding photobleaching the sample by briefly stopping the irradiation of the targeted sample between each consecutive acquisition, usually a few milliseconds, is preferable. The fluorescence background may be removed post-acquisition by methods.

Figure 13:
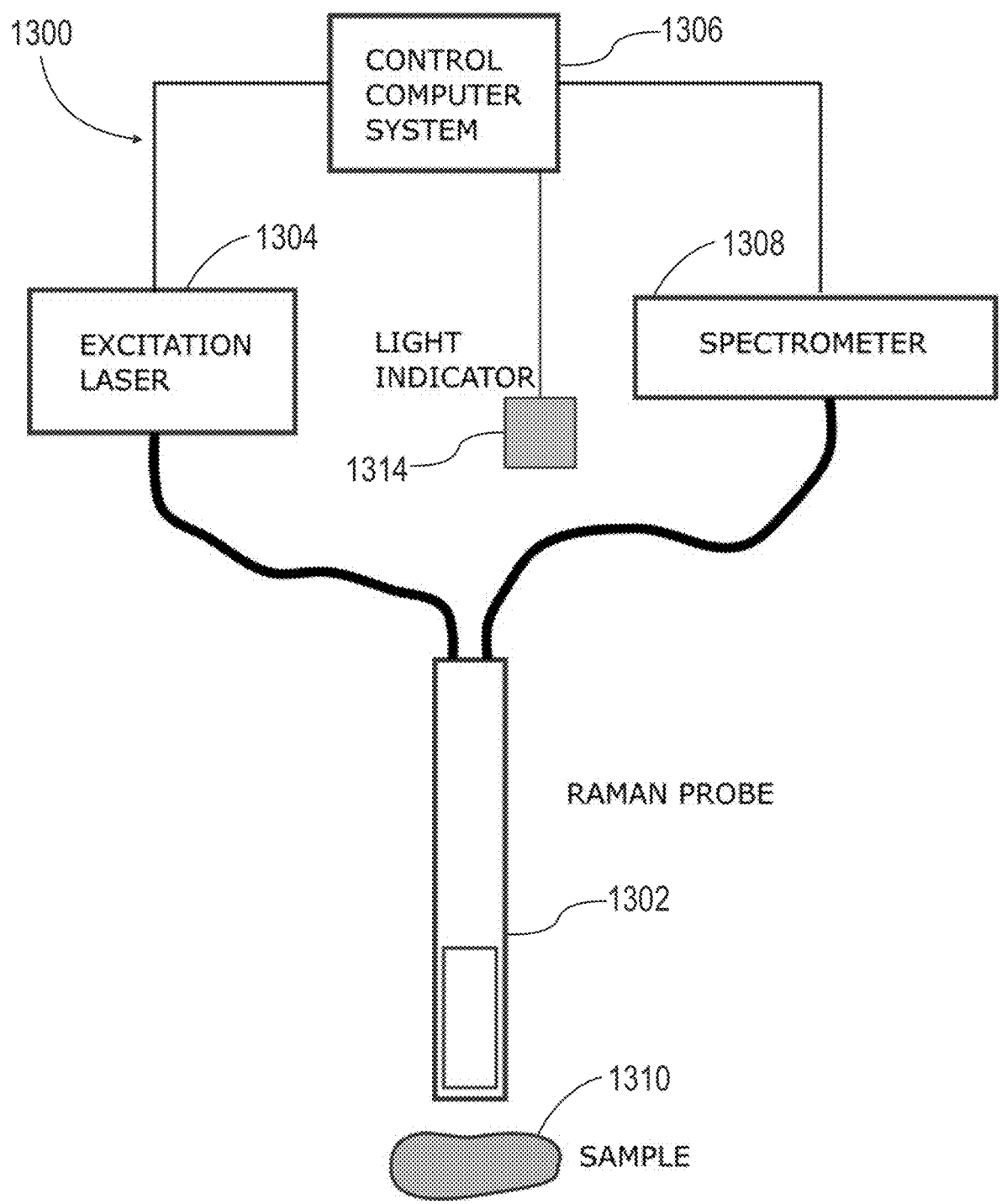
FIG. 13 is a diagram of a dynamic Raman signal acquisition system, in accordance with another embodiment.

With reference to FIG. 13, and in accordance with one exemplary embodiment, another example of a dynamic Raman signal acquisition system 1300 will now be described. This exemplary embodiment again comprises a Raman probe 1302, operatively connected via an optical waveguide to an excitation light source (laser) 1304, and operable of directing and focusing the monochromatic excitation therefrom to a biological tissue sample 1310. The probe is further operable to capture the scattering light from sample 1310 and directing it, via a waveguide, to a spectrometer 1308 for analysis. The probe 1302 may, in some embodiments, be integrated into a handheld device or similar. Spectrometer 1308 is operable to receive optical responses from a range of about 785-1200 nm for Stokes Raman detection with a laser excitation at 785 nm and from a range of 633-790 nm for Stokes Raman detection with a laser excitation at 633 nm. The system further comprises a controller (control computer system) 1306 operatively connected to both excitation light source 1304 and spectrometer 1308 and programmed to dynamically adjust at least one signal acquisition parameter, such as the irradiation power and/or acquisition time as a function of the measured optical response of one or multiple successive acquisitions. The controller 1306 may take various forms, which may include, but is not limited to, a dedicated computing or digital processing device, microprocessor, a general computing device, tablet and/or smartphone interface/application, and/or other computing device as may be readily appreciated by the skilled artisan. Furthermore, this controller 1306 may further comprise a digital screen display (not shown) to at least output information about the measured Raman response. In addition, this exemplary embodiment further comprises a light indicator device 1314, which may comprise one or more lighting devices (i.e. LED or similar), operationally connected to controller 1306 and operable to notify the user (via a combination of light colors, intensities, blinking, etc.) of the status of the acquisition process. This may include information about whether the device is proceeding with an acquisition or if it is stopped and/or on stand-by, if sample 1310 is damaged or if any hazardous chemicals were detected, if the probe has a good or bad optical contact with sample 1310, etc.

Figure 14:
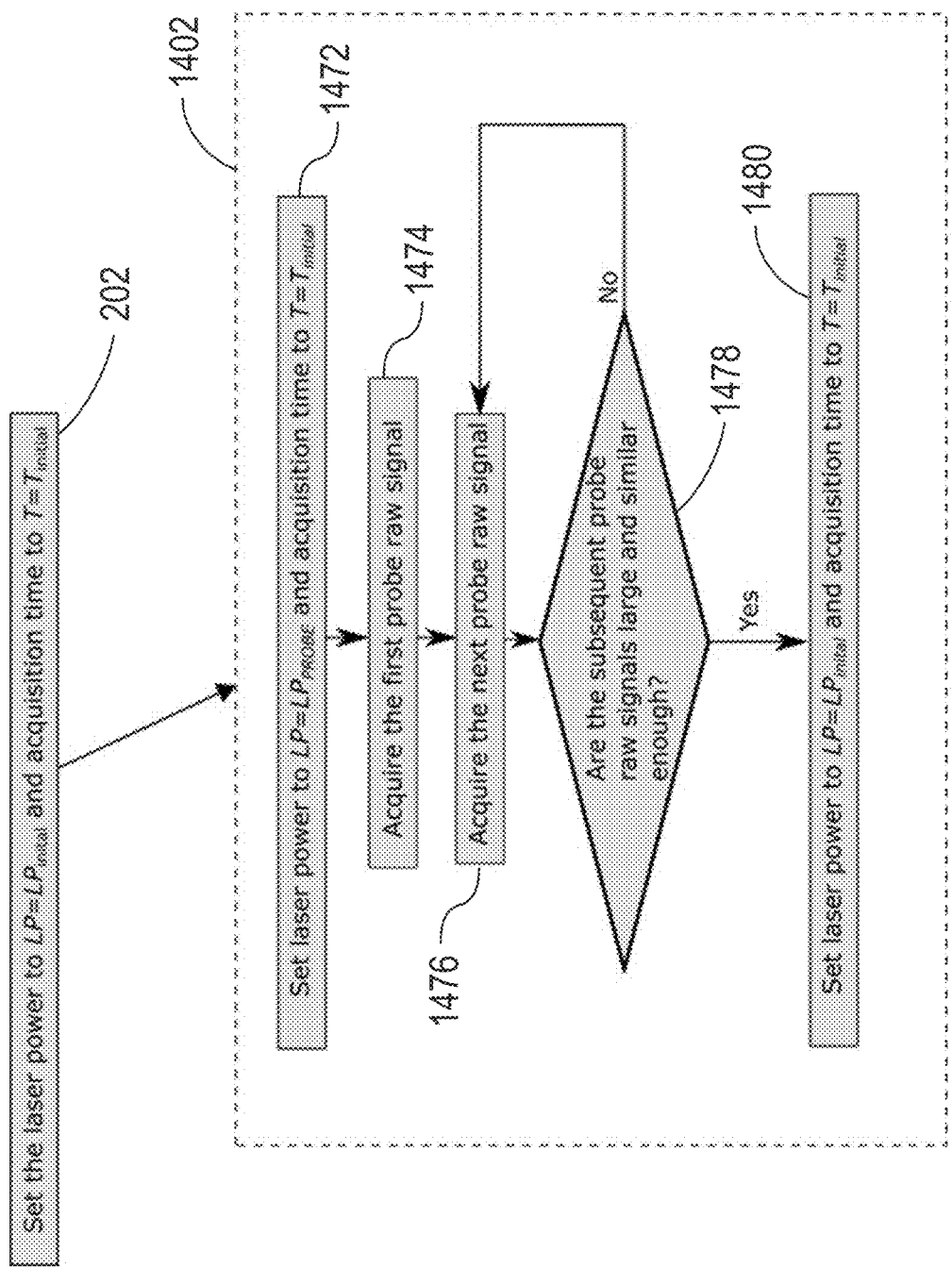
FIG. 14 is a process flow diagram of a pre-acquisition process of the dynamic Raman signal acquisition process of FIG. 2, in accordance with one embodiment.

With reference to FIG. 14, and in accordance with one embodiment, an alternative pre-acquisition process of the dynamic Raman signal acquisition process of FIG. 2 will now be described. In this exemplary embodiment, the step 202 shown in FIG. 2 is replaced by a series of steps 1402 wherein the system first probes the sample before continuing to step 204. For example, in may be useful for a surgeon using, for instance, a handheld embodiment of the Raman probe, to have the system autonomously start the acquisition phase (automated start-up process) if it detects that the probe is in stable optical contact with the sample. For example, the system may determine that the probe is indeed targeting a fixed sample by seeing detecting fixed Raman characteristics may the acquisition phase may begin. More precisely, the series of new steps 1402 start with step 1472, wherein the initial Laser Power is set to a lower laser power value optimized for probing the sample ($LP_{probe}$) instead of the normal initial Laser Power value ($LP_{initial}$). The system then acquires a first probe raw signal (step 1474) and a second raw signal (step 1476), which are then compared (step 1478) to determine if each raw signal is large enough and if both signals are similar enough. If either one of the signals is found to be too small or if large spectral differences are found between the two signals, then the system acquires a new probe raw signal and compares it to the last one (i.e. repeats step 1478). This is done until both raw signal strengths are deemed satisfactory and both raw signals are found to be similar enough. The similarity between the two probe raw signals is made to ensure that the probe is indeed targeting a fixed sample and that the real acquisition measurements can begin. As in the original step 202, step 1480 entails setting the laser power to $LP_{initial}$ and the acquisition time is set to $T_{initial}$, as above explained. The system then automatically continues the procedure detailed in FIG. 2.

Figure 15:
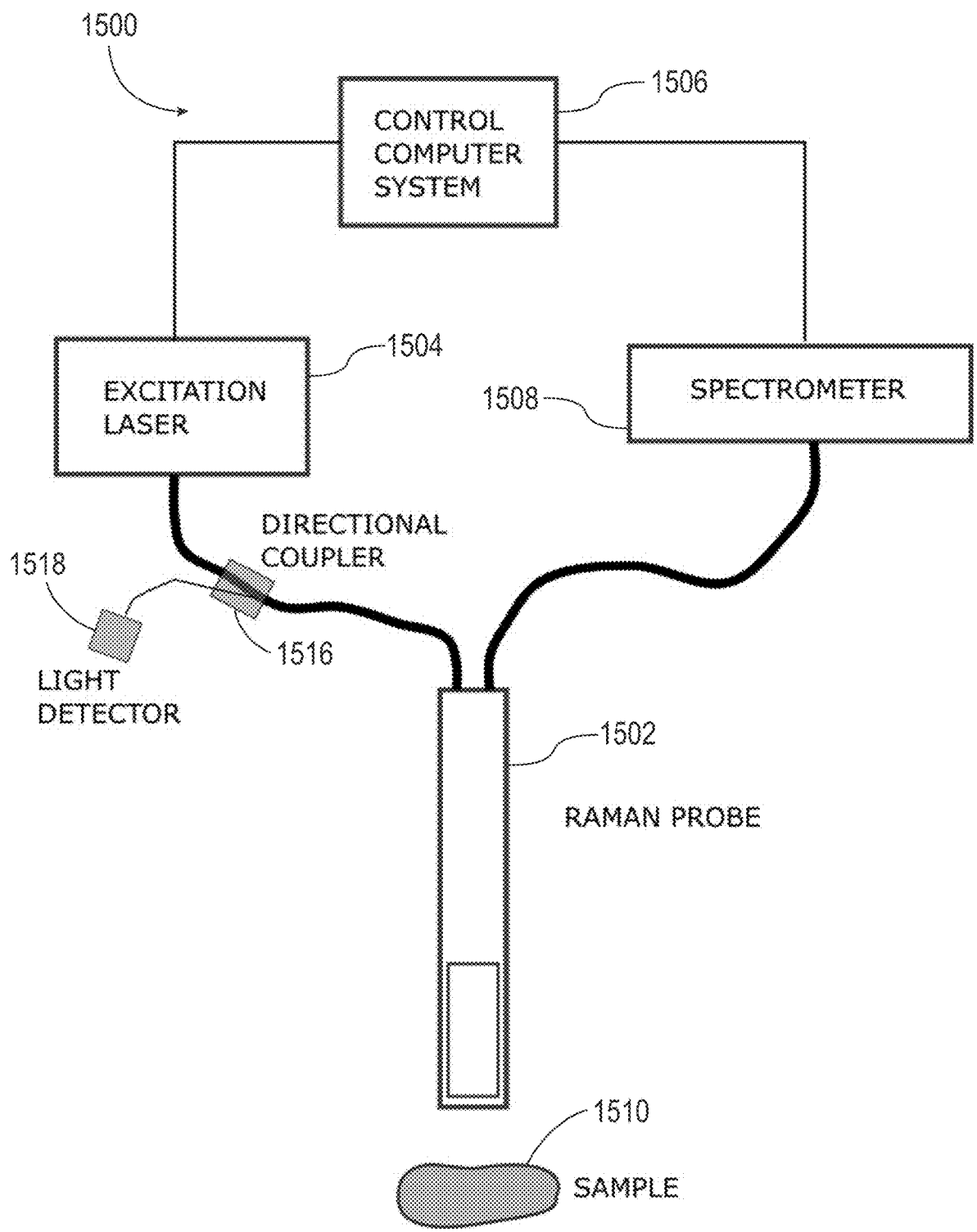
FIG. 15 is a diagram of a dynamic Raman signal acquisition system, in accordance with another embodiment.

With reference to FIG. 15, and in accordance with one embodiment, another dynamic Raman signal acquisition system 1500 will now be described. This exemplary embodiment again comprises a Raman probe 1502, operatively connected via an optical waveguide to an excitation light source (laser) 1504, and operable of directing and focusing the monochromatic excitation therefrom to a biological tissue sample 1510. The probe is further operable to capture the scattering light from sample 1510 and directing it, via a waveguide, to a spectrometer 1508 for analysis. The probe 1502 may, in some embodiments, be integrated into a handheld device or similar. Spectrometer 1508 may be operable to optical responses from a range of about 785-1200 nm for Stokes Raman detection with a laser excitation at 785 nm and from a range of 633-790 nm for Stokes Raman detection with a laser excitation at 633 nm. The system further comprises a controller (control computer system) 1506 operatively connected to both excitation light source 1504 and spectrometer 1508 and programmed to dynamically adjust at least one signal acquisition parameter, such as the irradiation power and/or acquisition time as a function of the measured optical response of one or multiple successive acquisitions. The controller 1506 may take various forms, which may include, but is not limited to, a dedicated computing or digital processing device, microprocessor, a general computing device, tablet and/or smartphone interface/application, and/or other computing device. Furthermore, this controller 1506 may further comprise a digital screen display (not shown) to at least output information about the measured Raman response. In addition, this exemplary embodiment further comprises an optical directional coupler 1516 connected to the optical waveguide between the excitation laser 1504 and Raman probe 1502, said directional coupler operatively connected to a light detector 1518. In some embodiments, the directional coupler 1516 and light detector 1518 may be integrated to probe 1502. The directional coupler is operable to detect back reflections of the light outputted from probe 1502, via light detector 1518, and identify that a good optical contact with sample 1510 has been established. The presence of a directional coupler allows for a very low probing excitation power (as explained above with respect to FIG. 14) when verifying that probe 1502 has a stable optical contact with sample 1510.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A dynamic Raman system for analyzing biological tissue and providing real-time optimization of a plurality of Raman system parameters in use, the system comprising:
    an excitation light source operable at a designated irradiation power and for a designated acquisition time for each Raman data acquisition;
    a Raman probe operatively associated with said excitation light source to irradiate the biological tissue at said designated irradiation power and for said designated acquisition time, and capture an optical Raman response therefrom;
    a spectrometer operable to spectrally analyze said optical Raman response; and
    a controller in operative communication with said excitation light source and said spectrometer to automatically adjust at least one signal acquisition parameter by:
    if the Raman probe is detected as being in stable optical contact with a sample of the biological tissue, autonomously commencing acquiring a Raman response signal for said designated irradiation power being set to a predetermined initial irradiation power and at said designated acquisition time;
    processing an amplitude of said Raman response signal against a designated threshold; and
    upon said Raman response signal being greater than said designated threshold, said controller is further operable to operatively lower said designated irradiation power and repeat for a subsequent said Raman response signal,
    wherein said Raman response signal comprises a maximum signal level for a series of initial Raman response signals,
    wherein the controller is configured to automatically adjust the at least one signal acquisition parameter as a function of a plurality of measured optical responses corresponding to one of: a plurality of successive acquisitions and a plurality of iterative acquisitions,
    wherein the controller is configured to terminate irradiation by the excitation light source via a time delay between one of successive acquisitions and iterative acquisitions, whereby photobleaching is avoided,
    wherein a plurality of dynamic adjustments to the plurality of Raman system parameters increases a number of useful acquisitions without invoking at least one of post-acquisition processing and signal repair, the plurality of dynamic adjustments at least minimizing a need for a plurality of manual adjustments to the plurality of Raman system parameters, and the plurality of Raman system parameters comprising: an irradiation power, an acquisition time, and a Raman response signal level, and
    wherein, once said signal acquisition parameter has been adjusted, said controller is further operable to operatively serially acquire a set of background-corrected Raman response signals until a signal-to-noise ratio (SNR) thereof is greater than a designated SNR threshold.

2. The Raman system of claim 1, wherein said predetermined initial irradiation power is a predetermined maximum irradiation power.

3. The Raman system of claim 1, wherein, upon said Raman response signal being below said designated threshold, said controller is further operable to dynamically increase said designated acquisition time to increase subsequent Raman response signals toward said threshold.

4. The Raman system of claim 1, wherein said controller is further operable to:
    acquire a first set of background signals to process said background-corrected Raman response signals, the first set of background signals comprising measured raw signal contributions from dark current and ambient light; and
    upon said SNR being greater than said designated SNR threshold, acquire a complementary set of background signals such that a total number of acquired background signals is equal to a total number of said background-corrected Raman signals to be used in post-processing said background-corrected Raman signals.

5. The Raman system of claim 1, wherein said controller is further operable to spectrally identify and automatically remove narrow band outliners from said Raman response signals.

6. The Raman system of claim 1, wherein said controller is further operable to spectrally identify an adverse safety feature from said Raman response signals and immediately suspend further acquisition.

7. The Raman system of claim 1, wherein said Raman probe comprises a handheld probe.

8. The Raman system of claim 1, wherein said excitation light source is directly controlled by said controller to adjust said designated irradiation power.

9. The Raman system of claim 1, wherein the system further comprises a power controller operatively disposed between said excitation light source and said Raman probe, and in operative communication with said controller to adjust said designated irradiation power.

10. A computerised method of dynamically acquiring Raman signals for analyzing biological tissue and providing real-time optimization of a plurality of Raman system parameters in use, the method comprising:
    irradiating the tissue at a designated irradiation power, initially set to a predetermined initial irradiation power, for a designated acquisition time;
    if the Raman probe is detected as being in stable optical contact with a sample of the biological tissue, autonomously commencing acquiring a Raman response signal from said irradiating at said designated irradiation power and at said designated acquisition time;
    processing an amplitude of said Raman response signal against a designated threshold; and
    upon said Raman response signal being greater than said designated threshold, dynamically decreasing said designated irradiation power; and
    repeating for a subsequent said Raman response signal, wherein said Raman response signal comprises a maximum signal level for a series of initial Raman response signals; and
    once said signal acquisition parameter has been adjusted, operatively serially acquiring a set of background-corrected Raman response signals until a signal-to-noise ratio (SNR) thereof is greater than a designated SNR threshold, wherein processing the amplitude of said Raman response signal comprises processing a maximum signal level for a series of initial Raman response signals, wherein processing the amplitude of said Raman response signal comprises automatically adjusting the at least one signal acquisition parameter as a function of a plurality of measured optical responses corresponding to one of: a plurality of successive acquisitions and a plurality of iterative acquisitions, wherein irradiating comprises terminating irradiation via a time delay between one of successive acquisitions and iterative acquisitions, thereby avoiding photobleaching, and wherein automatically adjusting the at least one signal acquisition parameter comprises automatically adjusting the plurality of Raman system parameters, thereby providing a plurality of dynamic adjustments and increasing a number of useful acquisitions without invoking at least one of post-acquisition processing and signal repair, the plurality of dynamic adjustments at least minimizing a need for a plurality of manual adjustments to the plurality of Raman system parameters, and the plurality of Raman system parameters comprising: an irradiation power, an acquisition time, and a Raman response signal level.

11. The computerized method of claim 10, wherein said predetermined initial irradiation power is a predetermined maximum irradiation power.

12. The computerized method of claim 10, wherein, upon said Raman response signal being below said designated threshold, further comprising dynamically increasing said designated acquisition time to increase subsequent Raman response signals toward said threshold.

13. The computerized method of claim 10, wherein the method further comprises:
    acquiring a first set of background signals to process said background-corrected Raman response signals, the first set of background signals comprising measured raw signal contributions from dark current and ambient light; and
    upon said SNR being greater than said designated SNR threshold, acquiring a complementary set of background signals such that a total number of acquired background signals is equal to a total number of said background-corrected Raman signals to be used in post-processing said background-corrected Raman signals.

14. The computerized method of claim 10, wherein the method further comprises spectrally identifying and removing narrow band outliners from said Raman response signals.

15. The computerized method of claim 10, wherein the method further comprises spectrally identifying an adverse safety feature in said Raman response signal and immediately suspending further acquisition.

16. A non-transitory computer-readable medium having instructions stored thereon for execution by a digital data processor of a dynamic Raman system to dynamically acquire Raman signals for analyzing biological tissue and providing real-time optimization of a plurality of Raman system parameters in use by:
    causing irradiation of the tissue at a designated irradiation power, initially set to a predetermined initial irradiation power, and for a designated acquisition time;
    if the Raman probe is detected as being in stable optical contact with a sample of the biological tissue, autonomously commencing acquiring a Raman response signal from said irradiating at said designated irradiation power and at said designated acquisition time;
    processing an amplitude of said Raman response signal against a designated threshold;
    upon said Raman response signal being greater than said designated threshold, dynamically decreasing said designated irradiation power; and
    repeating for a subsequent said Raman response signal,
    wherein said Raman response signal comprises a maximum signal level for a series of initial Raman response signals,
    wherein the processor is configured to automatically adjust the at least one signal acquisition parameter as a function of a plurality of measured optical responses corresponding to one of: a plurality of successive acquisitions and a plurality of iterative acquisitions,
    wherein the processor is configured to terminate irradiation by the excitation light source via a time delay between one of successive acquisitions and iterative acquisitions, whereby photobleaching is avoided,
    wherein a plurality of dynamic adjustments to the plurality of Raman system parameters increases a number of useful acquisitions without invoking at least one of post-acquisition processing and signal repair, the plurality of dynamic adjustments at least minimizing a need for a plurality of manual adjustments to the plurality of Raman system parameters, and the plurality of Raman system parameters comprising: an irradiation power, an acquisition time, and a Raman response signal level, and
    wherein, once said signal acquisition parameter has been adjusted, operatively serially acquiring a set of background-corrected Raman response signals until a signal-to-noise ratio (SNR) thereof is greater than a designated SNR threshold.

* * * * *